US010863579B2

(12) United States Patent
Kim

(10) Patent No.: US 10,863,579 B2
(45) Date of Patent: Dec. 8, 2020

(54) METHOD AND APPARATUS FOR ACCELERATING CIPHERING AND DECIPHERING IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 16/420,813

(22) Filed: May 23, 2019

(65) Prior Publication Data

US 2019/0373672 A1     Dec. 5, 2019

(30) Foreign Application Priority Data

Jun. 4, 2018 (KR) .................. 10-2018-0064488

(51) Int. Cl.
*H04W 80/08* (2009.01)
*H04L 1/16* (2006.01)
*H04W 28/06* (2009.01)
*H04L 9/32* (2006.01)
*H04W 80/02* (2009.01)
*H04W 12/00* (2009.01)
*H04L 5/00* (2006.01)

(52) U.S. Cl.
CPC ........... *H04W 80/08* (2013.01); *H04L 1/1642* (2013.01); *H04L 9/3242* (2013.01); *H04W 12/0017* (2019.01); *H04W 28/06* (2013.01); *H04W 80/02* (2013.01); *H04L 5/0007* (2013.01)

(58) Field of Classification Search
None
See application file for complete search history.

(56) References Cited

U.S. PATENT DOCUMENTS 8,547,900 B2 * 10/2013 Yi ..................... H04L 69/04
370/328
9,832,683 B2   11/2017 Fujishiro et al.
2016/0308776 A1 * 10/2016 Ozturk ............... H04L 47/365
2017/0181185 A1   6/2017 Lee et al.
(Continued)

FOREIGN PATENT DOCUMENTS

WO    2017/164603 A1    9/2017

OTHER PUBLICATIONS

International Search Report dated Sep. 9, 2019, issued in International Application No. PCT/KR2019/006264.

*Primary Examiner* — Eunsook Choi
(74) *Attorney, Agent, or Firm* — Jefferson IP Law, LLP

(57) ABSTRACT

An apparatus and a method capable of effectively providing services in a mobile communication system, and a data processing method of a data reception apparatus are provided. The apparatus and method includes obtaining, by a first lower packet data convergence protocol (PDCP) layer and a second lower PDCP layer, a plurality of PDCP packet data units (PDUs) based on data received from a first base station (BS) and a second BS, parallel deciphering, by the first and second lower PDCP layers, the plurality of PDCP PDUs, transmitting, from the first and second lower PDCP layers to an upper PDCP layer, the plurality of deciphered PDCP PDUs, and reordering, by the upper PDCP layer, the plurality of deciphered PDCP PDUs.

20 Claims, 19 Drawing Sheets

(56) References Cited

U.S. PATENT DOCUMENTS

| | | | |
|---|---|---|---|
| 2018/0098241 A1* | 4/2018 | Callard | H04W 80/06 |
| 2018/0206213 A1 | 7/2018 | Kim et al. | |
| 2019/0007291 A1* | 1/2019 | Yi | H04L 43/0852 |
| 2019/0044880 A1* | 2/2019 | Yi | H04L 47/624 |
| 2019/0075550 A1* | 3/2019 | Lee | H04W 72/02 |
| 2019/0174391 A1* | 6/2019 | Ode | H04W 76/27 |
| 2019/0280826 A1* | 9/2019 | Yi | H04L 47/624 |
| 2020/0084791 A1* | 3/2020 | Lee | H04L 1/1812 |
| 2020/0178128 A1* | 6/2020 | Ingale | H04W 36/14 |

* cited by examiner

FIG. 1I
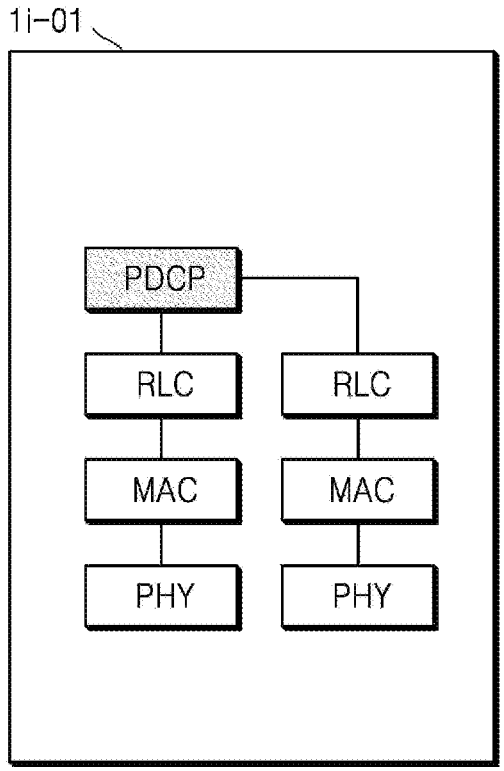
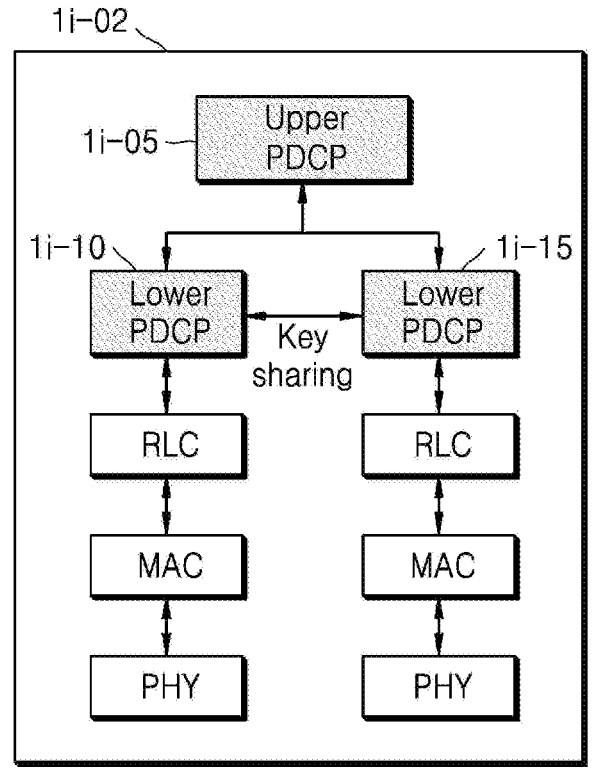
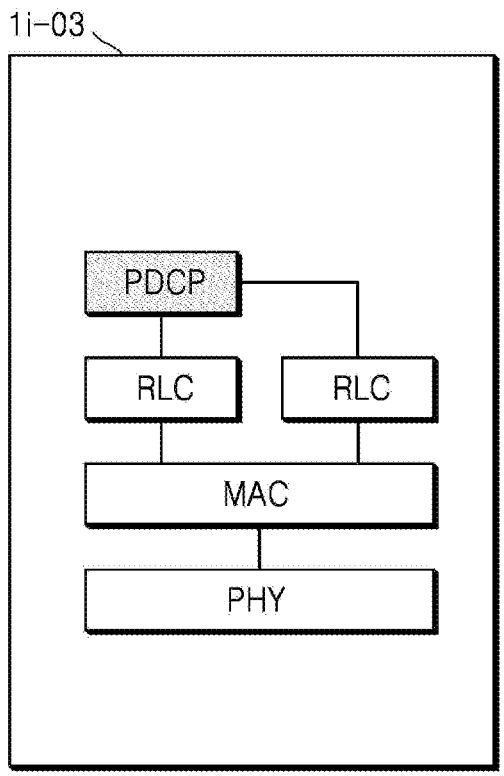
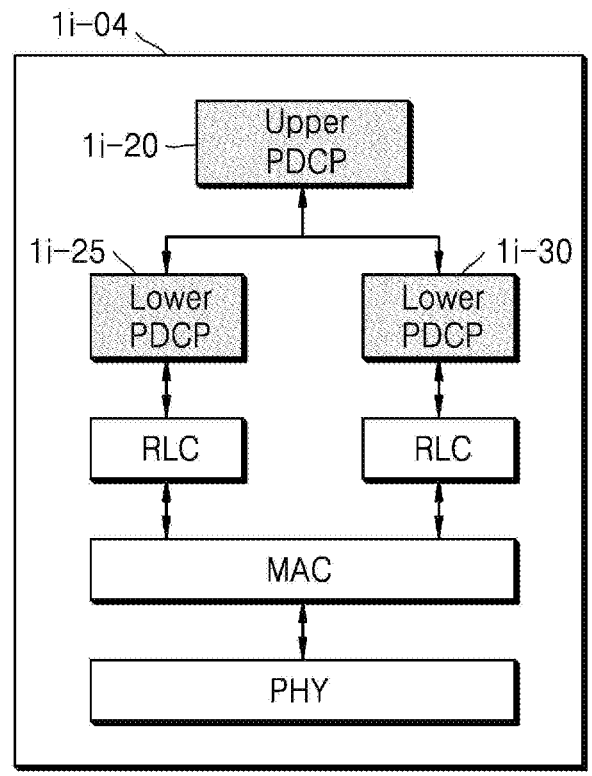

METHOD AND APPARATUS FOR ACCELERATING CIPHERING AND DECIPHERING IN WIRELESS COMMUNICATION SYSTEM

CROSS-REFERENCE TO RELATED APPLICATION(S)

This application is based on and claims priority under 35 U.S.C. § 119(a) of a Korean Patent Application number 10-2018-0064488, filed on Jun. 4, 2018, in the Korean Intellectual Property Office, the disclosure of which is incorporated by reference herein in its entirety.

BACKGROUND

1. Field

The disclosure relates to ciphering and deciphering in a wireless communication system.

2. Description of Related Art

To meet increasing demand for wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. 5G communication systems defined by the 3rd Generation Partnership Project (3GPP) are called new radio (NR) systems. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to NR systems. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the internet of things (IoT), where distributed elements such as objects exchange information with each other to process the information. internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In the IoT environment, intelligent internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of—Cloud-RAN as the above-described big data processing technology may be an example of convergence of 5G communication technology and IoT technology.

Because various services are able to be provided due to the development of mobile communication systems, methods capable of effectively providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of effectively providing services in a mobile communication system.

Additional aspects will be set forth in part in the description which follows and, in part, will be apparent from the description, or may be learned by practice of the presented embodiments.

In accordance with an aspect of the disclosure, a data processing method of a data reception apparatus is provided. The data processing method includes obtaining, by a first lower packet data convergence protocol (PDCP) layer and a second lower PDCP layer, a plurality of PDCP packet data units (PDUs) based on data received from a first base station (BS) and a second BS, parallel deciphering, by the first and second lower PDCP layers, the plurality of PDCP PDUs, transmitting, from the first and second lower PDCP layers to an upper PDCP layer, the plurality of deciphered PDCP PDUs, and reordering, by the upper PDCP layer, the plurality of deciphered PDCP PDUs.

The method may further include providing, from the upper PDCP layer to the first and second lower PDCP layers, security keys corresponding to the first and second BSs and used to decipher the plurality of PDCP PDUs.

The method may further include discarding, by the first and second lower PDCP layers, already received PDCP PDUs based on PDCP sequence number (SN) information provided from the upper PDCP layer.

The PDCP SN information may include information based on PDCP SNs of the PDCP PDUs, the PDCP SNs being received by each lower PDCP layer and the PDCP PDUs being provided from the first and second lower PDCP layers to the upper PDCP layer.

The PDCP SN information may include information based on PDCP SNs of the PDCP PDUs received by the upper PDCP layer from the first and second lower PDCP layers, or information based on PDCP SNs of PDCP PDUs having no integrity problems after integrity verification is performed on the PDCP PDUs received by the upper PDCP layer from the first and second lower PDCP layers.

In accordance with another aspect of the disclosure, a data processing method of a data transmission apparatus includes receiving, by an upper PDCP layer from an upper layer, a plurality of PDCP service data units (SDUs), allocating, by the upper PDCP layer, SNs corresponding to the plurality of received PDCP SDUs, transmitting, from the upper PDCP layer to a first lower PDCP layer and a second lower PDCP layer, the plurality of PDCP SDUs in a distributed manner at a certain ratio, and parallel ciphering, by the first and second lower PDCP layers, the plurality of PDCP SDUs.

The method may further include providing, from the upper PDCP layer to the first and second lower PDCP layers, security keys corresponding to a first BS and a second BS and used to cipher the plurality of PDCP SDUs.

The method may further include compressing, by the upper PDCP layer, each of generated headers when a header compression and decompression protocol is configured, and generating, by the upper PDCP layer, a message authentication code-integrity (MAC-I) corresponding to the plurality of PDCP SDUs when integrity protection is configured.

The method may further include concatenating, by the first and second lower PDCP layers, the headers corresponding to the plurality of PDCP SDUs, to the plurality of ciphered PDCP SDUs.

The upper PDCP layer may be controlled by an application processor.

In accordance with another aspect of the disclosure, a data reception apparatus in a wireless communication system is provided. The data reception apparatus includes a transceiver, and at least one processor coupled with the transceiver and configured to control a first lower PDCP layer and a second lower PDCP layer to obtain a plurality of PDCP PDUs based on data received from a first BS and a second BS, control the first and second lower PDCP layers to parallel decipher the plurality of PDCP PDUs, control the first and second lower PDCP layers to transmit, to an upper PDCP layer, the plurality of deciphered PDCP PDUs, and control the upper PDCP layer to reorder the plurality of deciphered PDCP PDUs.

The at least one processor may be further configured to control the upper PDCP layer to provide, to the first and second lower PDCP layers, security keys corresponding to the first and second BSs and used to decipher the plurality of PDCP PDUs.

The at least one processor may be further configured to control the first and second lower PDCP layers to discard already received PDCP PDUs based on PDCP SN information provided from the upper PDCP layer.

The PDCP SN information may include information based on PDCP SNs of the PDCP PDUs, the PDCP SNs being received by each lower PDCP layer and the PDCP PDUs being provided from the first and second lower PDCP layers to the upper PDCP layer.

The PDCP SN information may include information based on PDCP SNs of the PDCP PDUs received by the upper PDCP layer from the first and second lower PDCP layers, or information based on PDCP SNs of PDCP PDUs having no integrity problems after integrity verification is performed on the PDCP PDUs received by the upper PDCP layer from the first and second lower PDCP layers.

In accordance with another aspect of the disclosure, a data transmission apparatus in a wireless communication system is provided. The data transmission apparatus includes a transceiver, and at least one processor coupled with the transceiver and configured to control an upper PDCP layer to receive, from an upper layer, a plurality of PDCP SDUs, control the upper PDCP layer to allocate SNs corresponding to the plurality of received PDCP SDUs, control the upper PDCP layer to transmit, to a first lower PDCP layer and a second lower PDCP layer, the plurality of PDCP SDUs in a distributed manner at a certain ratio, and control the first and second lower PDCP layers to parallel cipher the plurality of PDCP SDUs.

The at least one processor may be further configured to control the upper PDCP layer to provide, to the first and second lower PDCP layers, security keys corresponding to a first BS and a second BS and used to cipher the plurality of PDCP SDUs.

The at least one processor may be further configured to control the upper PDCP layer to compress each of generated headers when a header compression and decompression protocol is configured, and control the upper PDCP layer to generate a MAC-I corresponding to the plurality of PDCP SDUs when integrity protection is configured.

The at least one processor may be further configured to control the first and second lower PDCP layers to concatenate the headers corresponding to the plurality of PDCP SDUs, to the plurality of ciphered PDCP SDUs.

The at least one processor configured to control the upper PDCP layer may include an application processor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1I is a schematic diagram for describing a method of applying a PDCP split structure to dual connectivity or packet duplication, according to an embodiment of the disclosure;

FIG. 1O is schematic diagram for describing a method of preventing unnecessary burden of processing, according to an embodiment of the disclosure;

Throughout the drawings, like reference numerals will be understood to refer to like parts, components, and structures.

DETAILED DESCRIPTION

Figure 1A:
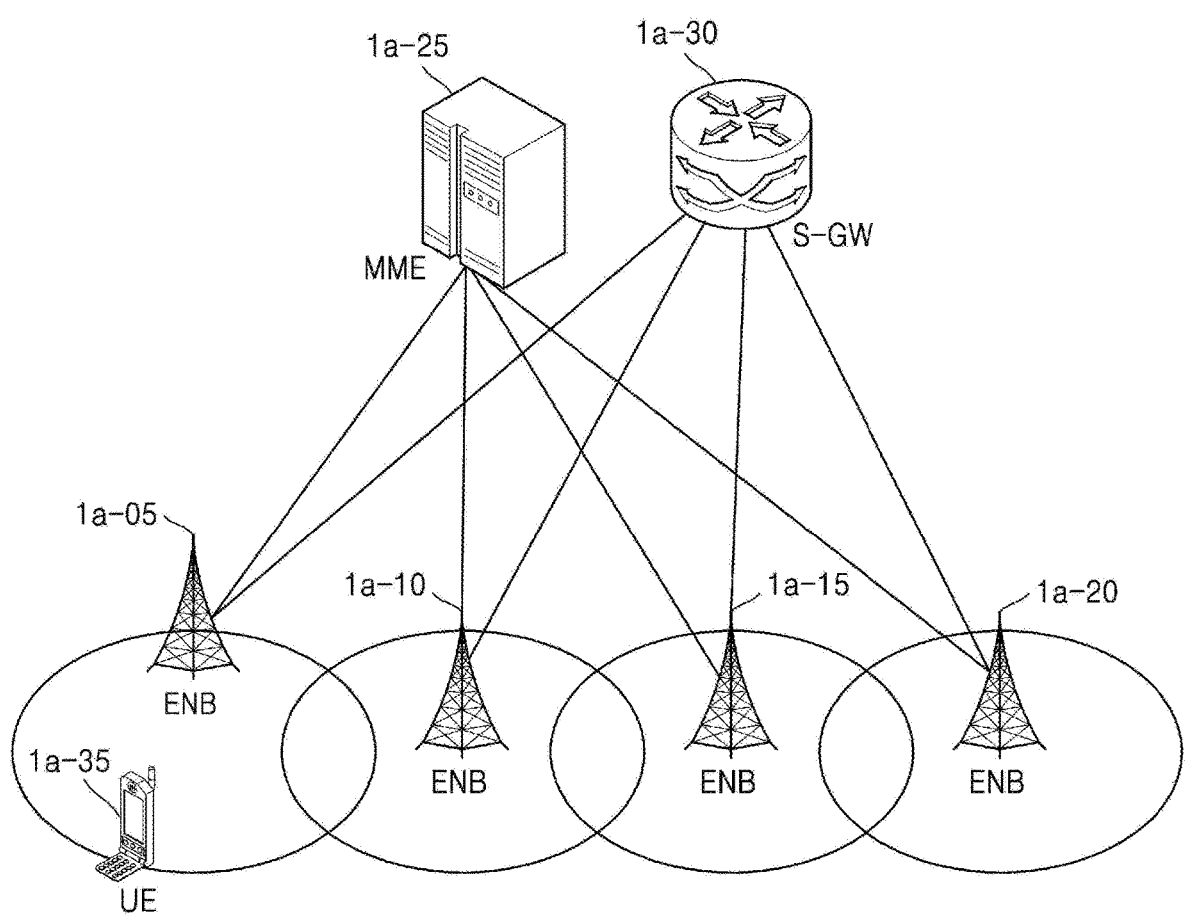
FIG. 1A is a schematic diagram of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, elements may be exaggerated, omitted, or schematically illustrated in the drawings for clarity. Also, the size of each element does not completely reflect a real size thereof. In the drawings, like reference numerals denote like elements.

One or more embodiments of the disclosure and methods of accomplishing the same may be understood more readily by reference to the following detailed description of the embodiments of the disclosure and the accompanying drawings. In this regard, the embodiments of the disclosure may have different forms and are not construed as being limited to the descriptions set forth herein. Rather, these embodiments of the disclosure are provided so that this disclosure will be thorough and complete and will fully convey the concept of the embodiments of the disclosure to one of ordinary skill in the art, and the disclosure will only be defined by the appended claims.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, the "unit" may include at least one processor.

Throughout the disclosure, the expression "at least one of a, b or c" indicates only a, only b, only c, both a and b, both a and c, both b and c, all of a, b, and c, or variations thereof.

In the following description, terms identifying access nodes, terms indicating network entities, terms indicating messages, terms indicating interfaces between network entities, terms indicating various types of identification information, etc. are merely selected for convenience of explanation. Therefore, the disclosure is not limited to these terms and other terms having technically equivalent meanings may also be used.

To facilitate explanation, the disclosure uses terms and names defined in the 3rd Generation Partnership Project (3GPP) long term evolution (LTE) communication standards. However, the disclosure is not limited to these terms and names and may be equally applied to systems conforming to other standards. In the following description, a base station (BS) is an entity for allocating resources for a user equipment (UE) and may include at least one of a gNode B (gNB), an eNode B (eNB), a Node B (NB), a BS, a radio access unit, a BS controller, or a node on a network. A UE may include a UE, a mobile station (MS), a cellular phone, a smart phone, a computer, or a multimedia system capable of performing communication functions. However, the BS and the UE are not limited to the above-mentioned examples.

The disclosure is applicable to intelligent services (e.g., smart home, smart building, smart city, smart car or connected car, healthcare, digital education, retail trade, security, and safety services) based on $5^{th}$ generation (5G) communication technologies and internet of things (IoT)-related technologies. In the following description, the term eNB may be interchangeably used with the term gNB for convenience of explanation. That is, a BS explained as an eNB may also indicate a gNB. The term UE may also indicate a mobile phone, NB-IoT devices, sensors, and other wireless communication devices.

Next-generation mobile communication systems such as new radio (NR) or 5G systems are aimed to provide a higher data rate and a lower latency. Thus, a UE or a BS needs to be able to process data at a higher data rate at a higher speed. Therefore, the disclosure proposes a method capable of accelerating a ciphering and deciphering procedure of a UE or a BS, which has a high data processing complexity, and services having a high data rate and a low latency may be provided using the proposed method.

A ciphering and deciphering procedure has the highest complexity among data processing procedures of a UE or a BS in a NR or 5G system. Therefore, a hardware accelerator may be adopted and used to accelerate the ciphering and deciphering procedure in a transmitter and a receiver. However, because faster data processing may be required to achieve a high data rate and a low latency, the disclosure proposes a split structure of a PDCP layer (also referred to as entity), the split structure being capable of accelerating a ciphering and deciphering procedure. In the proposed structure, the ciphering and deciphering procedure may be parallel performed by using a hardware accelerator and thus the speed of the ciphering and deciphering procedure may be increased by about two times.

Wireless communication systems providing voice-based services are being developed to broadband wireless communication systems providing high-speed and high-quality packet data services according to communication standards such as high speed packet access (HSPA), LTE or evolved universal terrestrial radio access (E-UTRA), LTE-advanced (LTE-A), LTE-pro of 3GPP, high rate packet data (HRPD) and ultra mobile broadband (UMB) of 3GPP2, and 802.16e of the institute of electrical and electronics engineers (IEEE).

As a representative example of the broadband wireless communication systems, LTE systems employ orthogonal frequency division multiplexing (OFDM) for a downlink (DL), and employs single carrier-frequency division multiple access (SC-FDMA) for an uplink (UL). The UL refers to a radio link for transmitting data or a control signal from a UE (or a MS) to a BS (e.g., a BS or an eNB), and the DL refers to a radio link for transmitting data or a control signal from the BS to the UE. The above-described multi-connectivity schemes distinguish between data or control information of different users by allocating time-frequency resources for the data or control information of the users not to overlap each other, i.e., to achieve orthogonality therebetween.

As post-LTE systems, 5G systems need to support services capable of simultaneously reflecting and satisfying various requirements of users, service providers, etc. Services considered for the 5G systems include enhanced mobile broadband (eMBB), massive machine-type communication (mMTC), and ultra-reliability low-latency communication (URLLC) services.

The eMBB service may be aimed to provide an enhanced data rate compared to a data rate supported by LTE, LTE-advanced (LTE-A), or LTE-Pro. For example, the eMBB service in the 5G systems need to provide a peak data rate of 20 gigabits per second (Gbps) for a DL and provide a peak data rate of 10 Gbps for a UL in view of a single BS. At the same time, the 5G systems may provide an increased user perceived data rate. To satisfy these requirements, the 5G systems may require various enhanced transmission/reception technologies including enhanced multiple-input and multiple-output (MIMO). The data rate required for the 5G systems may be satisfied by using a frequency bandwidth wider than 20 megahertz (MHz) in a frequency band of 3 to 6 gigahertz (GHz) or over 6 GHz compared to LTE systems currently using a transmission bandwidth of up to 20 MHz in a 2 GHz band.

At the same time, the mMTC service is considered for the 5G systems to support application services such as the internet of things (IoT). The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km$^2$). In addition, because UEs supporting mMTC may be located in a shadow zone, e.g., a basement of a building, due to service characteristics, the mMTC service may require a wider coverage compared to other services provided by the 5G systems. The UEs supporting mMTC need to be low-priced, and are not able to frequently replace batteries and thus require a very long battery life time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc. Thus, URLLC communication may provide a very low latency (e.g., ultra-low latency) and a very high reliability (e.g., ultra-reliability). For example, the URLLC service needs to satisfy an air interface latency less than 0.5 millisecond (ms) and, at the same time, may require a packet error rate equal to or less than $10^{-5}$. Therefore, for the URLLC service, the 5G systems need to provide a smaller transmit time interval (TTI) compared to other services and, at the same time, may be required to allocate wide resources in a frequency band to ensure reliability of a communication link.

The above-described three services considered for the 5G systems, i.e., the eMBB, URLLC, and mMTC services, may be multiplexed and provided by a single system. In this case, the services may use different transmission/reception schemes and different transmission/reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination of one of ordinary skill in the art.

FIG. 1A is a schematic diagram of an LTE system according to an embodiment of the disclosure.

Referring to FIG. 1A, a radio access network of the LTE system includes evolved nodes B (ENBs) or nodes B or eNB 1a-05, 1a-10, 1a-15, and 1a-20, a mobility management entity (MME) 1a-25, and a serving-gateway (S-GW) 1a-30. A UE 1a-35 may access an external network via the ENB 1a-05, 1a-10, 1a-15, or 1a-20 and the S-GW 1a-30.

In FIG. 1A, each of the ENBs 1a-05, 1a-10, 1a-15, and 1a-20 corresponds to an existing node B of a universal mobile telecommunications system (UMTS). Each ENB may be connected to the UE 1a-35 through radio channels and may perform complex functions compared to the existing node B. Because all user traffic data including real-time services such as voice over Internet protocol (VoIP) are serviced through shared channels in the LTE system, an entity for collating, for example, buffer status information of UEs, available transmit power status information, and channel status information and performing scheduling may be required and each of the ENBs 1a-05, 1a-10, 1a-15, and 1a-20 may serve as such an entity. One ENB may generally control a plurality of cells. For example, the LTE system may use radio access technology such as OFDM at a bandwidth of 20 MHz to achieve a data rate of 100 Mbps. The ENB may also use adaptive modulation & coding (AMC) to determine a modulation scheme and a channel coding rate in accordance with a channel status of the UE 1a-35. The S-GW 1a-30 is an entity for providing data bearers and may establish and release the data bearers under the control of the MME 1a-25. The MME 1a-25 is an entity for performing a mobility management function and various control functions on the UE 1a-35 and may be connected to a plurality of BSs.

Figure 1B:
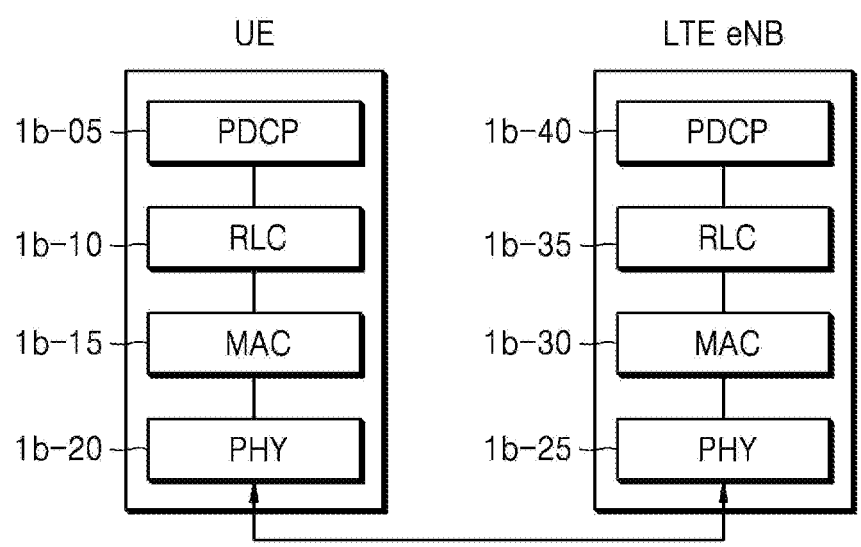
FIG. 1B is a schematic diagram illustrating a radio protocol architecture of an LTE system according to an embodiment of the disclosure.

FIG. 1B is a schematic diagram illustrating a radio protocol architecture of an LTE system according to an embodiment of the disclosure.

Referring to FIG. 1B, the radio protocol architecture of the LTE system may include PDCP layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 may be in charge of, for example, IP header compression/decompression. Main functions of the PDCP layer 1b-05 or 1b-40 are summarized as shown below but are not limited thereto.

Header compression and decompression: robust header compression (ROHC) only
    Transfer of user data
    In-sequence delivery of upper layer packet data units (PDUs) at PDCP re-establishment procedure for RLC acknowledged mode (AM)
    For split bearers in dual connectivity (DC) (only support for RLC AM): PDCP PDU routing for transmission and PDCP PDU reordering for reception
    Duplicate detection of lower layer SDUs at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based service data unit (SDU) discard in UL According to some embodiments of the disclosure, the RLC layer 1b-10 or 1b-35 may perform, for example, an automatic repeat request (ARQ) operation by reconfiguring PDCP PDUs to an appropriate size. Main functions of the RLC layer 1b-10 or 1b-35 may be summarized as shown below but are not limited thereto.

Transfer of upper layer PDUs
    Error correction through ARQ (only for AM data transfer)
    Concatenation, segmentation and reassembly of RLC SDUs (only for unacknowledged mode (UM) and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment According to some embodiments of the disclosure, the MAC layer 1b-15 or 1b-30 may be connected to a plurality of RLC layers configured for one UE and may multiplex RLC PDUs into a MAC PDU and demultiplex the RLC PDUs from the MAC PDU. Main functions of the MAC layer 1b-15 or 1b-30 may be summarized as shown below but are not limited thereto.

Mapping between logical channels and transport channels
    Multiplexing/demultiplexing of MAC SDUs belonging to one or different logical channels into/from transport blocks (TBs) delivered to/from the physical (PHY) layer on transport channels
    Scheduling information reporting
    Error correction through hybrid ARQ (HARQ)
    Priority handling between logical channels of one UE
    Priority handling between UEs by means of dynamic scheduling
    Multimedia broadcast/multicast service (MBMS) service identification
    Transport format selection
    Padding According to some embodiments of the disclosure, a PHY layer 1b-20 or 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer. However, the function of the PHY layer 1b-20 or 1b-25 is not limited thereto.

Figure 1C:
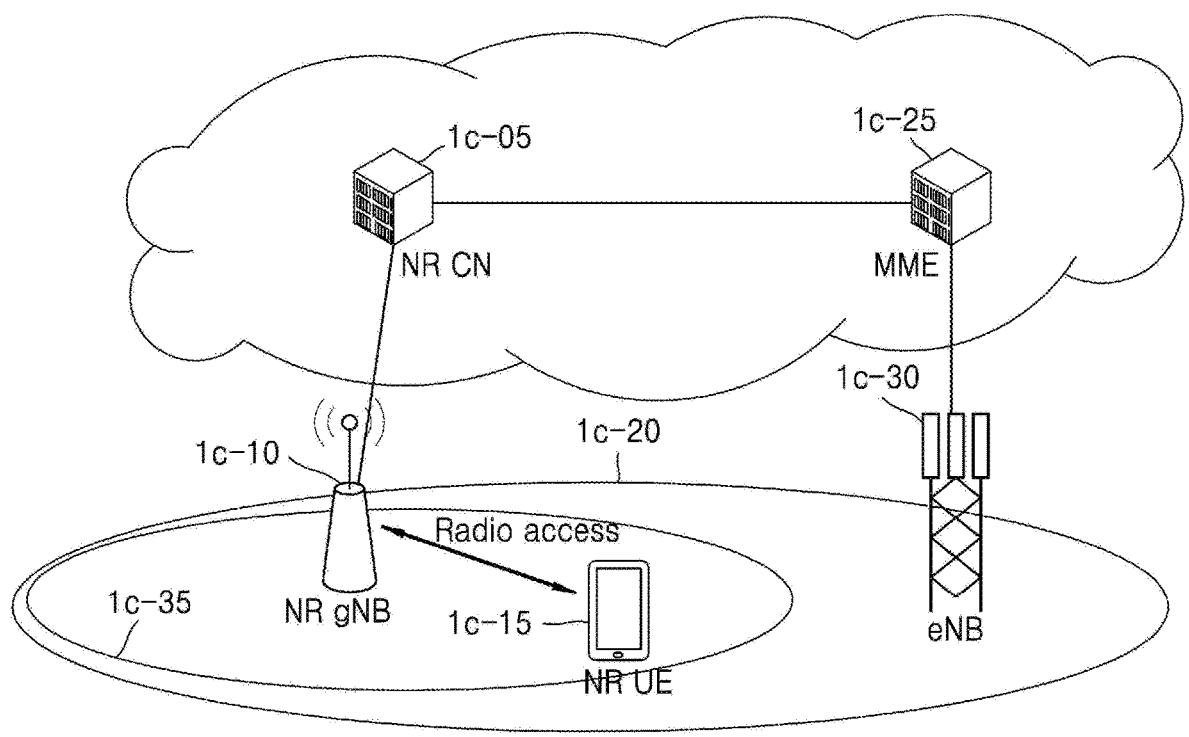
FIG. 1C is a schematic diagram of a new radio (NR) or $5^{th}$ generation (5G) communication system according to an embodiment of the disclosure.

FIG. 1C is a schematic diagram of a NR or 5G communication system according to an embodiment of the disclosure.

Referring to FIG. 1C, a radio access network of the NR (or 5G) system includes a new radio node B (NR gNB, NR NB, or gNB) 1c-10 and a new radio core network (NR CN) 1c-05. A new radio user equipment (NR UE) 1c-15 may access an external network via the NR gNB 1c-10 and the NR CN 1c-05. The NR gNB 1c-10 may serve a coverage area 1c-35.

Referring to FIG. 1C, the NR gNB 1c-10 may correspond to an evolved node B (eNB) of an existing LTE system. The NR gNB 1c-10 may be connected to the NR UE 1c-15 through radio channels and may provide superior services compared to an existing node B. Because all user traffic data are serviced through shared channels in the NR or 5G system, an entity for collating, for example, buffer status information of UEs, available transmit power status information, and channel status information and performing scheduling may be required and the NR gNB 1c-10 may serve as such an entity. One NR gNB may generally control a plurality of cells. The NR or 5G system may currently have a bandwidth greater than the maximum bandwidth of existing LTE to achieve an ultrahigh data rate, may use OFDM as radio access technology, and may additionally use beamforming technology.

According to some embodiments of the disclosure, the NR gNB 1c-10 may apply AMC to determine a modulation scheme and a channel coding rate in accordance with a channel status of the NR UE 1c-15. The NR CN 1c-05 may perform functions such as mobility support, bearer configuration, and quality of service (QoS) configuration. The NR CN 1c-05 is an entity for performing a mobility management function and various control functions on the NR UE 1c-15 and may be connected to a plurality of BSs. The NR or 5G system may cooperate with the existing LTE system, and the NR CN 1c-05 may be connected to a MME 1c-25 through a network interface. The MME 1c-25 may be connected to an existing eNB 1c-30 serving coverage area 1c-20.

Figure 1D:
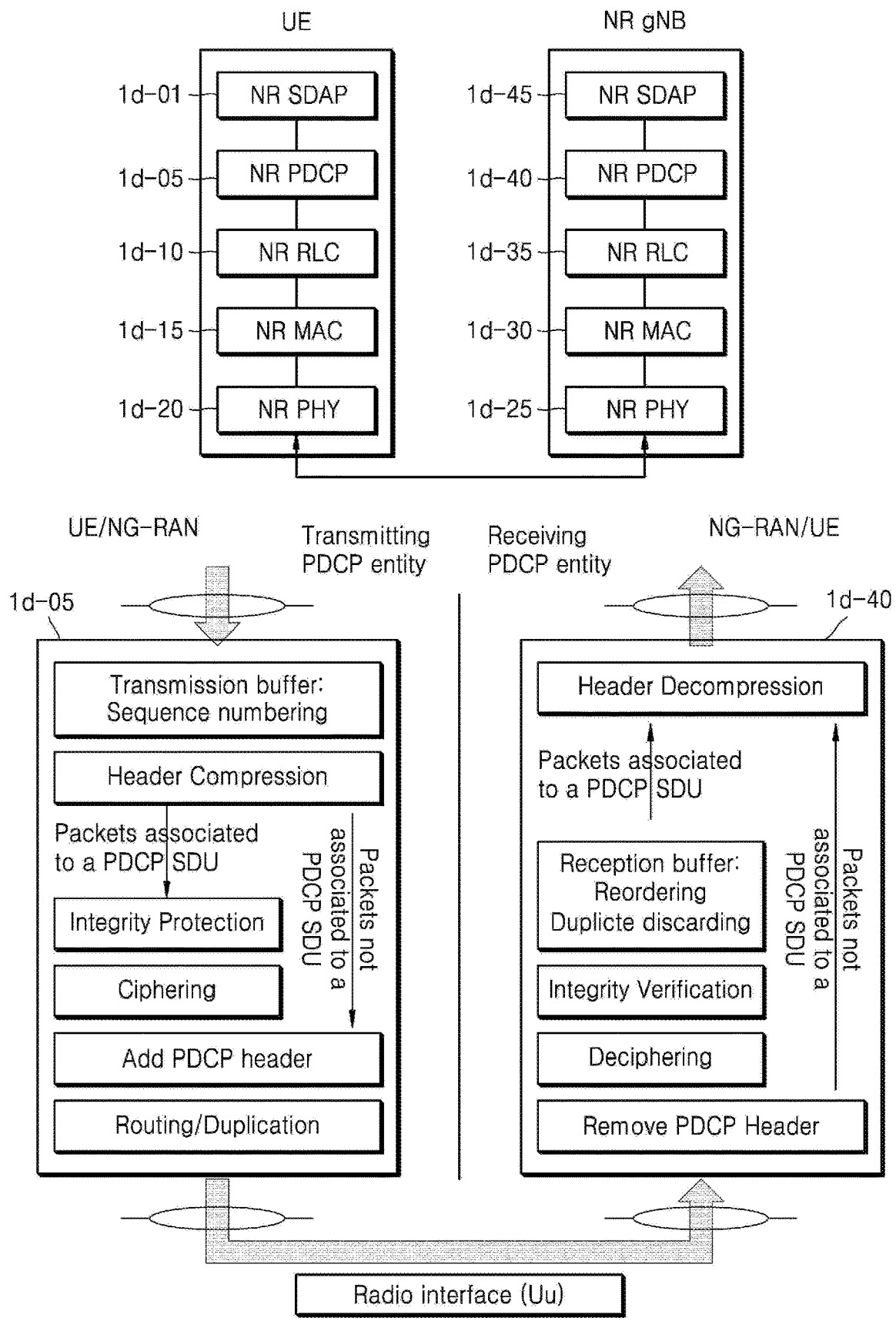
FIG. 1D is a schematic diagram illustrating a radio protocol architecture of an NR or 5G system according to an embodiment of the disclosure.

FIG. 1D is a schematic diagram illustrating a radio protocol architecture of an NR or 5G system according to an embodiment of the disclosure.

Referring to FIG. 1D, the radio protocol architecture of the NR or 5G system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and a NR gNB.

Main functions of the NR SDAP entity 1d-01 or 1d-45 may include some of the following functions but are not limited thereto.
  Transfer of user plane data
  Mapping between a QoS flow and a data radio bearer (DRB) for both DL and UL
  Marking QoS flow identifier (ID) in both DL and UL packets
  Reflective QoS flow to DRB mapping for the UL SDAP PDUs With regard to a SDAP layer, information about whether to use a header of the SDAP layer or to use functions of the SDAP layer may be configured for the UE by using a radio resource control (RRC) message per PDCP layer, per bearer, or per logical channel. When the SDAP header is configured, the SDAP layer may direct the UE to update or reconfigure UL and DL QoS flow and data bearer mapping information by using a 1-bit non access stratum (NAS) reflective QoS indicator and a 1-bit access stratum (AS) reflective QoS indicator of the SDAP header.

According to some embodiments of the disclosure, the SDAP header may include QoS flow ID information indicating QoS. According to some embodiments of the disclosure, QoS information may be used as data processing priority information or scheduling information for appropriately supporting a service.

According to some embodiments of the disclosure, main functions of the NR PDCP layer 1d-05 or 1d-40 may include some of the following functions but are not limited thereto.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in UL According to some embodiments of the disclosure, the reordering function of the NR PDCP layer 1d-05 or 1d-40 may include at least one of a function of reordering PDCP PDUs received from a lower layer, on a PDCP sequence number (SN) basis, a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

According to some embodiments of the disclosure, main functions of the NR RLC layer 1d-10 or 1d-35 may include some of the following functions but are not limited thereto.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment According to some embodiments of the disclosure, the in-sequence delivery function of the NR RLC layer 1d-10 or 1d-35 may include at least one of a function of delivering RLC SDUs received from a lower layer, to an upper layer in order, a function of reassembling a plurality of RLC SDUs segmented from one RLC SDU and delivering the reassembled RLC SDU when the segmented RLC SDUs are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer is started, to an upper layer in order although a missing RLC SDU exists when a certain timer is expired, or a function of delivering all RLC SDUs received up to a current time, to an upper layer in order although a missing RLC SDU exists when a certain timer is expired. The NR RLC layer 1d-10 or 1d-35 may process the RLC PDUs in order of reception (in order of arrival regardless of SNs) and deliver the RLC PDUs to a PDCP layer out of order (out-of sequence delivery), or reassemble segmented RLC PDUs received or stored in a buffer, into a whole RLC PDU and process and deliver the RLC PDU to the PDCP layer. According to some embodiments of the disclosure, the NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery function of the NR RLC layer 1d-10 or 1d-35 may include at least one of a function of delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

According to some embodiments of the disclosure, the NR MAC layer 1d-15 or 1d-30 may be connected to a plurality of NR RLC layers configured for one UE, and main functions of the NR MAC layer 1d-15 or 1d-30 may include some of the following functions but are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding According to some embodiments of the disclosure, a NR PHY layer 1d-20 or 1d-25 may channel-code and modulate upper layer data into OFDM symbols and transmit the OFDM symbols through a radio channel, or demodulate OFDM symbols received through a radio channel and channel-decode and deliver the OFDM symbols to an upper layer. However, the function of the NR PHY layer 1d-20 or 1d-25 is not limited thereto.

Figure 1E:
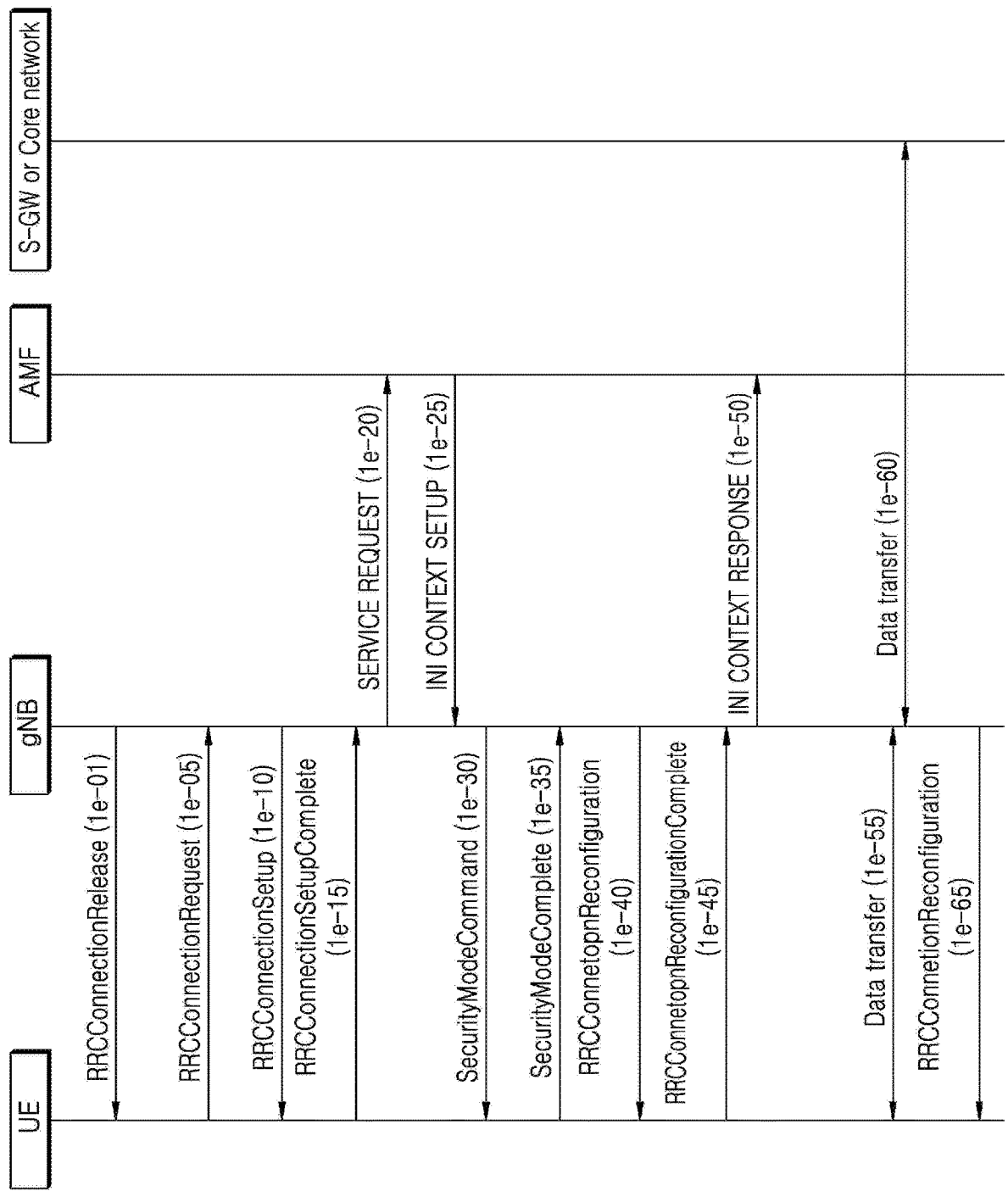
FIG. 1E is a flowchart of a procedure for establishing a radio resource control (RRC) connection between a gNode B (gNB) and a user equipment (UE) in a case when the UE establishes a connection with a network in an NR or 5G system, according to an embodiment of the disclosure.

FIG. 1E is a flowchart of a procedure for establishing an RRC connection between a gNB and a UE in a case when the UE establishes a connection with a network in an NR or 5G system, according to an embodiment of the disclosure.

Referring to FIG. 1E, when the UE for transmitting and receiving data does not perform data transmission or reception in an RRC connected mode due to any reason or for a certain period, the gNB may send an RRCConnectionRelease message to the UE to switch the UE to an RRC idle mode in operation 1e-01. When the UE which is not currently connected (hereinafter referred to as an idle mode UE) has data to be transmitted, an RRC connection establishment procedure with the gNB may be performed.

The UE establishes reverse transmission synchronization with the gNB through a random access procedure and transmits an RRCConnectionRequest message to the gNB in operation 1e-05. The RRCConnectionRequest message may include, for example, a UE identity (ID) and an establishmentCause.

The gNB transmits an RRCConnectionSetup message to the UE to establish an RRC connection in operation 1e-10. The RRCConnectionSetup message may include logical channel configuration information, bearer configuration information, PDCP configuration information, RLC configuration information, and MAC configuration information.

According to some embodiments of the disclosure, for example, PDCP configuration information, a bearer ID, a logical channel ID, mapping information between logical channels and cells (frequencies), cell group configuration information, and a threshold value to be used for dual connectivity may be set in the RRCConnectionSetup message to configure dual connectivity and carrier aggregation for the UE. According to some embodiments of the disclosure, the RRCConnectionSetup message may include, for example, RRC connection configuration information.

According to some embodiments of the disclosure, an RRC connection may also be called a signaling radio bearer (SRB) and may be used to transmit and receive RRC messages, which are control messages, between the UE and the gNB. The RRC-connected UE transmits an RRCConnetionSetupComplete message to the gNB in operation 1e-15.

The RRCConnetionSetupComplete message may include a control message such as a SERVICE REQUEST message used when the UE requests an access and mobility management function (AMF) or MME to establish a bearer for a certain service. The gNB transmits the SERVICE REQUEST message included in the RRCConnetionSetupComplete message, to the AMF or MME in operation 1e-20, and the AMF or MME may determine whether to provide the service requested by the UE.

Upon determining to provide the service requested by the UE, the AMF or MME transmits an INITIAL CONTEXT SETUP REQUEST message to the gNB in operation 1e-25. The INITIAL CONTEXT SETUP REQUEST message may include QoS information to be applied to establish a DRB and security information to be applied to the DRB (e.g., a security key or a security algorithm).

The gNB exchanges a SecurityModeCommand message in operation 1e-30 and a SecurityModeComplete message in operation 1e-35 with the UE to set a security mode. After the security mode is completely set, the gNB transmits an RRCConnectionReconfiguration message to the UE in operation 1e-40.

The RRCConnectionReconfiguration message may include at least one of logical channel configuration information, bearer configuration information, PDCP configuration information, RLC configuration information, or MAC configuration information.

According to some embodiments of the disclosure, for example, PDCP configuration information, a bearer ID, a logical channel ID, mapping information between logical channels and cells (frequencies), cell group configuration information, and a threshold value to be used for dual connectivity may be set in the RRCConnectionReconfiguration message to configure dual connectivity and carrier aggregation for the UE. The RRCConnectionReconfiguration message may include DRB configuration information for processing user data, and the UE establishes a DRB by using the DRB configuration information and transmits an RRCConnectionReconfigurationComplete message to the gNB in operation 1e-45. The gNB having completely established the DRB with the UE may transmit an INITIAL CONTEXT SETUP COMPLETE message to the AMF or MME to complete connection in operation 1e-50.

When the above-described procedures are all completed, the UE transmits and receives data to and from the gNB and a core network in operations 1e-55 and 1e-60. According to some embodiments of the disclosure, a data transfer procedure mainly includes three operations such as RRC connection configuration, security configuration, and DRB configuration. The gNB may transmit an RRCConnectionReconfiguration message to the UE to renew, add, or change the RRC connection due to any reason in operation 1e-65. The RRCConnectionReconfiguration message may include at least one of logical channel configuration information, bearer configuration information, PDCP configuration information, RLC configuration information, or MAC configuration information. For example, PDCP configuration information, a bearer ID, a logical channel ID, mapping information between logical channels and cells (frequencies), cell group configuration information, and a threshold value to be used for dual connectivity may be set in the RRCConnectionReconfiguration message to configure dual connectivity and carrier aggregation for the UE.

Figure 1F:
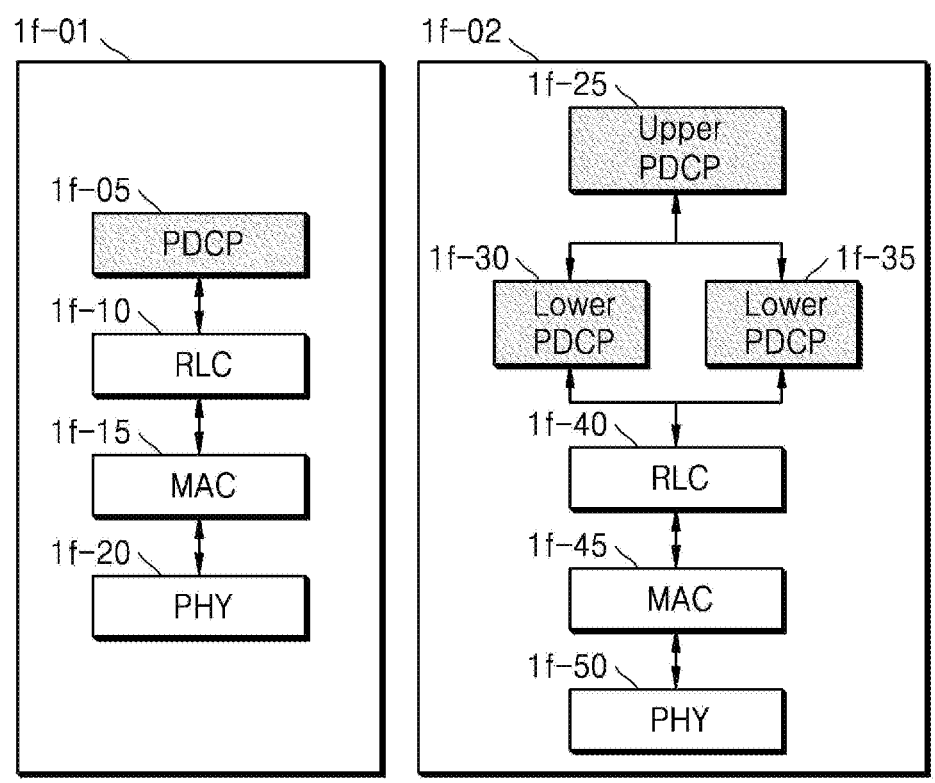
FIG. 1F is a schematic diagram illustrating a packet data convergence protocol (PDCP) split structure according to an embodiment of the disclosure.

FIG. 1F is a schematic diagram illustrating a PDCP split structure according to an embodiment of the disclosure.

Referring to FIG. 1F, 1f-01 indicates a protocol architecture for processing data in a general bearer. The protocol architecture 1f-01 has a structure in which a receiver performs a data processing procedure in reverse order of a data processing procedure of a transmitter.

For example, in the receiver (e.g., a UE or a BS), a PHY layer 1f-20 processes received data and delivers the data (e.g., a MAC PDU) to a MAC layer 1f-15, and the MAC layer 1f-15 reads a MAC header from the data delivered from the PHY layer 1f-20, checks a logical channel ID, and delivers the data (e.g., a RLC PDU) to a logical channel or a RLC layer 1f-10 corresponding to the logical channel ID.

When MAC control information (e.g., a MAC control element) is included in the data delivered from the PHY layer 1f-20, the MAC layer 1f-15 checks the control information and performs a corresponding processing procedure of the MAC layer 1f-15.

According to some embodiments of the disclosure, the MAC layer 1f-15 may be connected to a plurality of RLC layers having unique logical channel IDs but one RLC layer 1f-10 is illustrated in the protocol architecture 1f-01 for convenience of explanation. The RLC layer 1f-10 having received the data from the MAC layer 1f-15 may read a RLC header, determine whether segmented data is received, and deliver non-segmented data to an upper PDCP layer 1f-05, or store segmented data in a buffer, configure complete data (e.g., a complete RLC SDU) by performing reassembly when other segmented data units are received later, and deliver the data to the upper PDCP layer 1f-05.

According to some embodiments of the disclosure, when the RLC layer 1f-10 is an LTE RLC layer as described above in relation to FIG. 1B, the RLC layer 1f-10 may deliver the data (e.g., PDCP PDUs) to the upper PDCP layer 1f-05 by reordering the data on an RLC SN basis. When the RLC layer 1f-10 is a NR RLC layer as described above in relation to FIG. 1D, the RLC layer 1f-10 may directly deliver non-segmented data to the upper PDCP layer 1f-05 regardless of RLC SNs, i.e., out of order.

The PDCP layer 1f-05 of the receiver may check a PDCP header of the data received from the RLC layer 1f-10, decipher the data, perform integrity verification when integrity verification is configured, and deliver the data (e.g., PDCP SDUs) to an upper layer by reordering the data on a PDCP SN basis. When ROHC header compression/decompression is configured, the PDCP layer 1f-05 may perform ROHC header decompression on a PDCP SN basis.

As described above, the layers in the protocol architecture 1f-01 may support bidirectional (transmitting or receiving) data processing (UL data processing or DL data processing). The structure proposed by the disclosure may also be applied to a protocol having SDAP layers as described above in relation to FIG. 1D, and to a protocol having no SDAP layers as described above in relation to FIG. 1B.

In the transmitter (e.g., a UE or a BS), when data is received by an upper layer, the data (e.g., PDCP SDUs) may be delivered to the lower PDCP layer 1f-05. When the PDCP layer 1f-05 receives the data from the upper layer and when ROHC header compression/decompression is configured, the PDCP layer 1f-05 may perform ROHC header compression. When integrity protection is configured, the PDCP layer 1f-05 may generate a PDCP header, perform integrity protection on a PDCP PDU (the PDCP header and the PDCP SDU), generate a message authentication code-integrity (MAC-I), cipher the PDCP SDU and the MAC-I, concatenate the PDCP header, and deliver the data to the lower RLC layer 1f-10.

The RLC layer 1f-10 may configure data units (e.g., RLC PDUs) to correspond to the size of transmission resources allocated from the lower MAC layer 1f-15, and deliver the data to the lower MAC layer 1f-15. According to some embodiments of the disclosure, when the data is configured to correspond to the transmission resources and when necessary, the RLC layer 1f-10 may perform segmentation and configure and update a corresponding RLC header.

When the data is received from the RLC layer 1f-10, the MAC layer 1f-15 may allocate logical channel IDs in such a manner that data units received from RLC layers (logical channels) correspond to logical channels, allocate an L field corresponding to a data size, configure a MAC header, configure data (e.g., a MAC PDU) corresponding to the transmission resources, and deliver the data to the lower PHY layer 1f-20, and thus the PHY layer 1f-20 may physically transmit the data.

As described above, data processing corresponding to each bearer or each logical channel as in the protocol architecture 1f-01 is performed by one RLC layer and one PDCP layer. Thus, a ciphering or deciphering procedure having the highest data processing complexity is performed by one PDCP layer sequentially on a series of data units to be transmitted or having received (sequential processing). Therefore, a hardware accelerator may be used to accelerate the ciphering or deciphering procedure on a series of data units. According to some embodiments of the disclosure, the hardware accelerator may be a separate block in a system on chip (SoC), and may be implemented in one modem. The hardware accelerator may be a separate hardware module which has no access to a main central processing unit (CPU) and does not require processing capability of the main CPU. According to some embodiments of the disclosure, the hardware accelerator may achieve a very high efficiency for repeated and continuous processing.

The disclosure proposes a PDCP split structure as shown in a protocol architecture 1f-02 to perform a sequential ciphering and deciphering procedure (sequential processing) at a higher speed in the protocol architecture 1f-01. The PDCP split structure is characterized in that the PDCP layer functions described above in relation to FIG. 1B or 1D are divided and are performed by an upper PDCP layer 1f-25 and lower PDCP layers 1f-30 and 1f-35.

For example, the upper PDCP layer 1*f*-25 may manage window state variables or a reordering timer, drive a PDCP transmit or receive window, and perform duplicate packet detection or reordering on a PDCP SN basis. However, the functions of the upper PDCP layer 1*f*-25 are not limited thereto. The lower PDCP layers 1*f*-30 and 1*f*-35 may perform duplicate packet detection or ciphering and deciphering. However, the functions of the lower PDCP layers 1*f*-30 and 1*f*-35 are not limited thereto.

According to some embodiments of the disclosure, the upper PDCP layer 1*f*-25 of the receiver is one layer and may receive, from the two lower PDCP layers 1*f*-30 and 1*f*-35, data units that are parallel deciphered (parallel processing), and deliver the data to an upper layer by reordering the data. The upper PDCP entity 1*f*-25 of the transmitter may deliver data units received from an upper layer, to the two lower PDCP layers 1*f*-30 and 1*f*-35 in a distributed manner to parallel cipher the received data units (parallel processing), and an RLC layer 1*f*-40 may reorder and process the data units on a PDCP SN basis. Thereafter, the data units are handled by the MAC layer 1*f*-45 and PHY layer 1*f*-50.

As described above, the disclosure proposes the PDCP split structure as shown in the protocol architecture 1*f*-02 and thus a ciphering and deciphering procedure having a high complexity may be parallel performed by the lower PDCP layers 1*f*-30 and 1*f*-35 (parallel processing). In addition, the lower PDCP layers 1*f*-30 and 1*f*-35 may parallel perform the ciphering and deciphering procedure by using a hardware accelerator and thus data processing may be accelerated.

Using the PDCP split structure proposed by the disclosure, various structures having one upper PDCP layer and two lower PDCP layers may be implemented by dividing the PDCP layer functions described above in relation to FIG. 1B or 1D, and a function having a high complexity may be parallel performed by the two lower PDCP layers. In addition, not only a ciphering or deciphering procedure but also an UL data compression/decompression (UDC) procedure for compressing or decompressing UL or DL data may be parallel performed by the lower PDCP layers. In other words, various embodiments of the disclosure may be enabled. The number of lower PDCP layers is not particularly limited and may be two or more.

Figure 1G:
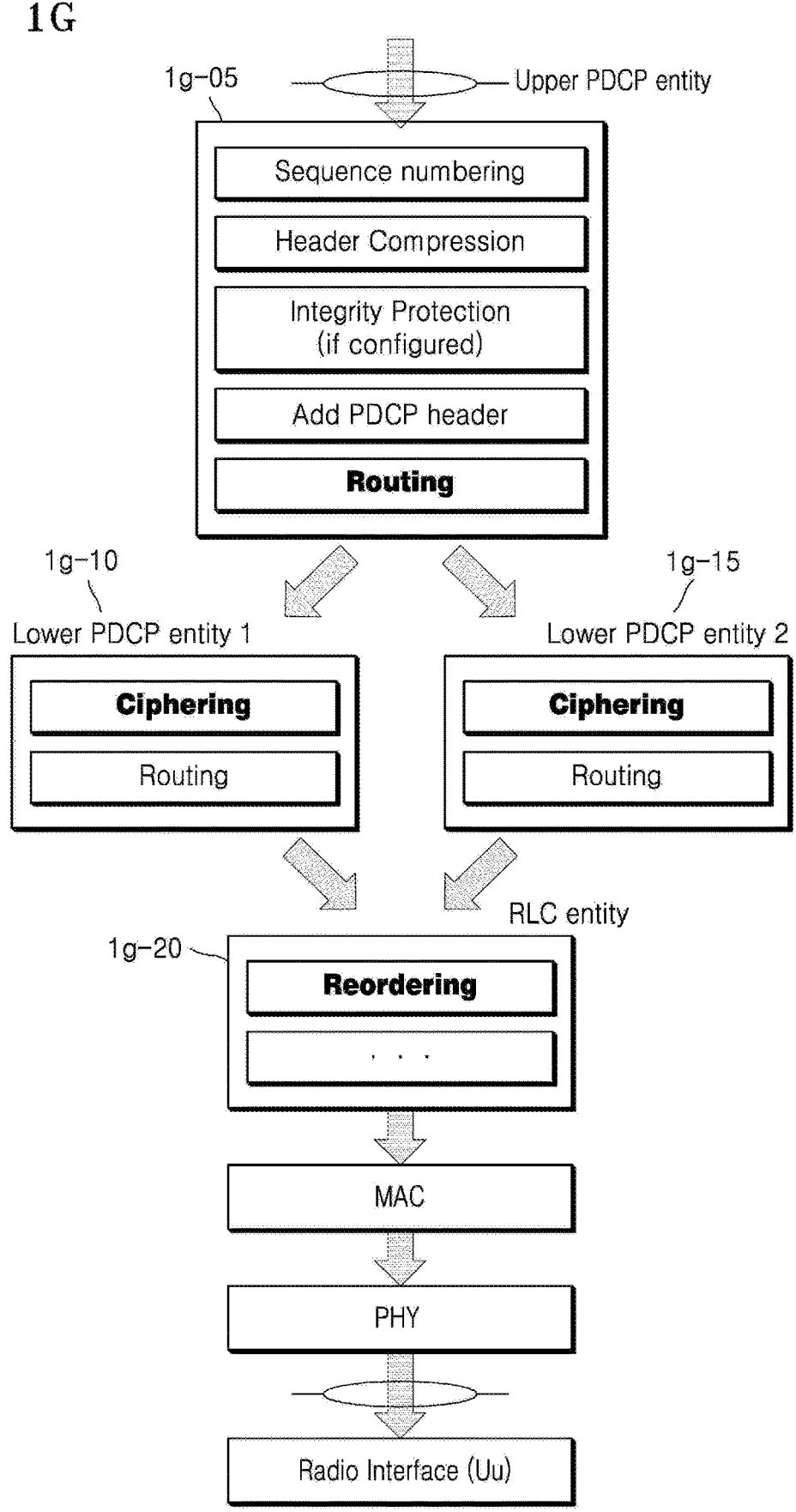
FIG. 1G is a schematic diagram of a transmitter (e.g., a base station (BS) or a UE) to which a PDCP split structure is applied, according to an embodiment of the disclosure.

FIG. 1G is a schematic diagram of a transmitter (e.g., a BS or a UE) to which a PDCP split structure is applied, according to an embodiment of the disclosure.

Referring to FIG. 1G, when data is received by an upper layer, the upper PDCP layer 1*g*-05 of the transmitter (e.g., a UE or a BS) may deliver the data (e.g., PDCP SDUs) to lower PDCP layers 1*g*-10 and 1*g*-15 in a distributed manner.

According to some embodiments of the disclosure, the upper PDCP layer 1*g*-05 may deliver the data units received from the upper layer, to the lower PDCP layers 1*g*-10 and 1*g*-15 in a distributed manner at a certain ratio. For example, the upper PDCP layer 1*g*-05 may deliver the data in a distributed manner by equal proportions.

According to some embodiments of the disclosure, when the upper PDCP layer 1*g*-05 receives the data and when ROHC header compression/decompression is configured, the upper PDCP layer 1*g*-05 may perform ROHC header compression. When integrity protection is configured, the upper PDCP layer 1*g*-05 may generate a PDCP header, perform integrity protection on a PDCP PDU (the PDCP header and the PDCP SDU), generate a MAC-I, and deliver the PDCP SDU and the MAC-I to the lower PDCP layers 1*g*-10 and 1*g*-15. When integrity protection is not configured, the upper PDCP layer 1*g*-05 may deliver the PDCP SDU to the lower PDCP layers 1*g*-10 and 1*g*-15. The lower PDCP layers 1*g*-10 and 1*g*-15 having received the data may parallel cipher the data, concatenate the PDCP header, and deliver the data to a lower RLC layer 1*g*-20.

According to some embodiments of the disclosure, the RLC layer 1*g*-20 may receive the ciphered data units from the two lower PDCP layers 1*g*-10 and 1*g*-15 out of order. The RLC layer 1*g*-20 may configure RLC headers for the data units received from the two lower PDCP layers 1*g*-10 and 1*g*-15, reorder the data units in ascending order of PDCP SNs, and deliver the data units to a lower MAC.

The RLC layer 1*g*-20 may configure data units (e.g., RLC PDUs) to correspond to the size of transmission resources allocated from the lower MAC layer, and deliver the data units to the lower MAC layer. When the data is configured to correspond to the transmission resources and when necessary, the RLC layer 1*g*-20 may perform segmentation and configure and update a corresponding RLC header. When the data is received from the RLC layer 1*g*-20, the MAC layer may allocate logical channel IDs in such a manner that data units received from RLC layers (logical channels) 1*g*-20 correspond to logical channels, allocate an L field corresponding to a data size, configure a MAC header, configure data (e.g., a MAC PDU) corresponding to the transmission resources, and deliver the data to a lower PHY layer, and thus the PHY layer may physically transmit the data.

Figure 1H:
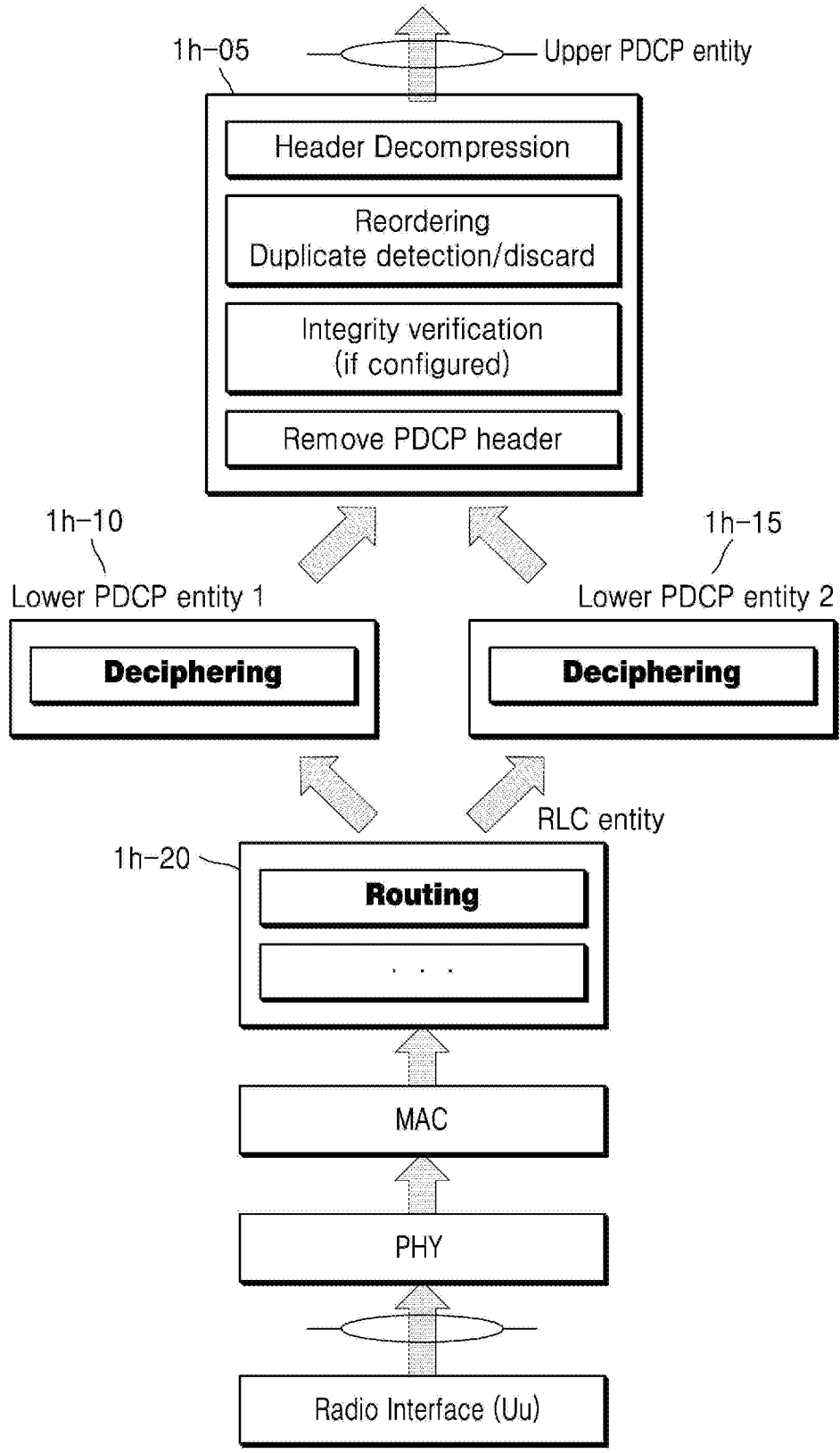
FIG. 1H is a schematic diagram of a receiver (e.g., a BS or a UE) to which a PDCP split structure is applied, according to an embodiment of the disclosure.

FIG. 1H is a schematic diagram of a receiver (e.g., a BS or a UE) to which a PDCP split structure is applied, according to an embodiment of the disclosure.

Referring to FIG. 1H, in the receiver (e.g., a UE or a BS), a PHY layer processes received data and delivers the data (e.g., a MAC PDU) to a MAC layer, and the MAC layer reads a MAC header from the data delivered from the PHY layer, checks a logical channel ID, and delivers the data (e.g., a RLC PDU) to a logical channel or a RLC layer 1*h*-20 corresponding to the logical channel ID.

When MAC control information (e.g., a MAC control element) is included in the data delivered from the PHY layer, the MAC layer checks the control information and performs a corresponding processing procedure of the MAC layer. The MAC layer may be connected to a plurality of RLC layers 1*h*-20 having unique logical channel IDs but one RLC layer 1*h*-20 is illustrated for convenience of explanation.

The RLC layer 1*h*-20 having received the data may read a RLC header, determine whether segmented data is received, and deliver non-segmented data to an upper PDCP layer, or store segmented data in a buffer, configure complete data (e.g., a complete RLC SDU) by performing reassembly when other segmented data units are received later, and deliver the data to an upper PDCP layer 1*h*-05 or lower PDCP layers 1*h*-10 and 1*h*-15. When the RLC layer 1*h*-20 is an LTE RLC layer as described above in relation to FIG. 1B, the RLC layer 1*h*-20 may deliver the data (e.g., PDCP PDUs) to the upper PDCP layer 1*h*-05 or the lower PDCP layers 1*h*-10 and 1*h*-15 by reordering the data on an RLC SN basis. When the RLC layer 1*h*-20 is a NR RLC layer as described above in relation to FIG. 1D, the RLC layer 1*h*-20 may directly deliver non-segmented data to the upper PDCP layer 1*h*-05 or the lower PDCP layers 1*h*-10 and 1*h*-15 regardless of RLC SNs, i.e., out of order.

The RLC layer 1*h*-20 may be connected to the two lower PDCP layers 1*h*-10 and 1*h*-15, and may deliver the data units received from the lower layer, to the two lower PDCP layers 1*h*-10 and 1*h*-15 in a distributed manner. That is, the RLC layer 1*h*-20 may deliver the received data units to the two lower PDCP layers 1*h*-10 and 1*h*-15 in a distributed manner at a certain ratio out of order. For example, the RLC layer 1*h*-20 may deliver the data units to the two lower PDCP layers 1*h*-10 and 1*h*-15 by equal proportions. The lower PDCP layers 1*h*-10 and 1*h*-15 having received the data may parallel perform a deciphering procedure having a high complexity. Each of the lower PDCP layers 1*h*-10 and 1*h*-15 may deliver the deciphered data units to the upper PDCP layer 1*h*-05 out of order or in the order in which the deciphering procedure is completed. The upper PDCP layer 1*h*-05 may check a PDCP header of the data received from the two lower PDCP layers 1*h*-10 and 1*h*-15, perform integrity verification when integrity verification is configured, and deliver the data (e.g., PDCP SDUs) to an upper layer by reordering the data on a PDCP SN basis. When ROHC header compression/decompression is configured, the upper PDCP layer 1*h*-05 may perform ROHC header decompression on each data unit in ascending order of PDCP SNs. In addition, the upper PDCP layer 1*h*-05 may perform a duplicate detection procedure for detecting and discarding duplicate data on a PDCP SN basis.

FIG. 1I is a schematic diagram for describing a method of applying a PDCP split structure to dual connectivity or packet duplication, according to an embodiment of the disclosure.

Referring to FIG. 1I, 1*i*-01 indicates a protocol architecture for processing data in a split bearer using dual connectivity. The protocol architecture 1*i*-01 has a structure in which a receiver performs a data processing procedure in reverse order of a data processing procedure of a transmitter.

For example, in the receiver (e.g., a UE or a BS), each of two PHY layers processes received data and delivers the data (e.g., a MAC PDU) to a MAC layer corresponding to the PHY layer, and the MAC layer reads a MAC header from the data delivered from the PHY layer, checks a logical channel ID, and delivers the data (e.g., a RLC PDU) to a logical channel or a RLC layer corresponding to the logical channel ID and connected to the MAC layer.

When MAC control information (e.g., a MAC control element) is included, the control information is checked and a corresponding processing procedure of the MAC layer is performed.

According to some embodiments of the disclosure, each MAC layer may be connected to a plurality of RLC layers having unique logical channel IDs but one MAC layer is connected to one RLC layer in the protocol architecture 1*i*-01 for convenience of explanation. The RLC layer having received the data from the MAC layer may read a RLC header, determine whether segmented data is received, and deliver non-segmented data to an upper PDCP layer, or store segmented data in a buffer, configure complete data (e.g., a complete RLC SDU) by performing reassembly when other segmented data units are received later, and deliver the data to the upper PDCP layer.

According to some embodiments of the disclosure, when the RLC layer is an LTE RLC layer as described above in relation to FIG. 1B, the RLC layer may deliver the data (e.g., PDCP PDUs) to the upper PDCP layer by reordering the data on an RLC SN basis. When the RLC layer is a NR RLC layer as described above in relation to FIG. 1D, the RLC layer may directly deliver non-segmented data to the upper PDCP layer regardless of RLC SNs, i.e., out of order.

According to some embodiments of the disclosure, the PDCP layer may receive data from two RLC layers, check a PDCP header of the received data, decipher the data, perform integrity verification when integrity verification is configured, and deliver the data (e.g., PDCP SDUs) to an upper layer by reordering the data on a PDCP SN basis. When ROHC header compression/decompression is configured, the PDCP layer may perform ROHC header decompression on a PDCP SN basis.

As described above, the layers in the protocol architecture 1*i*-01 may support bidirectional (transmitting or receiving) data processing (UL data processing or DL data processing). The structure proposed by the disclosure may also be applied to a protocol having SDAP layers as described above in relation to FIG. 1D, and to a protocol having no SDAP layers as described above in relation to FIG. 1B.

In the transmitter (e.g., a UE or a BS), when data is received by an upper layer, the data (e.g., PDCP SDUs) may be delivered to the lower PDCP layer. When the PDCP layer receives the data from the upper layer and when ROHC header compression/decompression is configured, the PDCP layer may perform ROHC header compression. When integrity protection is configured, the PDCP layer may generate a PDCP header, perform integrity protection on a PDCP PDU (the PDCP header and the PDCP SDU), generate a MAC-I, cipher the PDCP SDU and the MAC-I, concatenate the PDCP header, and deliver the data to the two lower RLC layers.

According to some embodiments of the disclosure, when the data is delivered to the two lower RLC layers, the PDCP layer may deliver the data to one of the two lower RLC layers when the amount of the data does not exceed a certain threshold value, or deliver the data to the two lower RLC layers in a distributed manner when the amount of the data exceeds the certain threshold value. However, the data delivery is not limited thereto.

Each RLC layer may configure data units (e.g., RLC PDUs) to correspond to the size of transmission resources allocated from the lower MAC layer, and deliver the data units to the lower MAC layer. According to some embodiments of the disclosure, when the data is configured to correspond to the transmission resources and when necessary, the RLC layer may perform segmentation and configure and update a corresponding RLC header. When the data is received from the RLC layer, the MAC layer may allocate logical channel IDs in such a manner that data units received from RLC layers (logical channels) correspond to logical channels, allocate an L field corresponding to a data size, configure a MAC header, configure data (e.g., a MAC PDU) corresponding to the transmission resources, and deliver the data to the lower PHY layer, and thus the PHY layer may physically transmit the data.

As described above, data processing in a split bearer using dual connectivity as in the protocol architecture 1*i*-01 is performed by two RLC layers and one PDCP layer. Thus, a ciphering or deciphering procedure having the highest data processing complexity is performed by one PDCP layer sequentially on a series of data units to be transmitted or having received (sequential processing). Therefore, a hardware accelerator may be used to accelerate the ciphering or deciphering procedure on a series of data units. According to some embodiments of the disclosure, the hardware accelerator may be a separate block in a SoC chip, and may be implemented in one modem. The hardware accelerator may be a separate hardware module which has no access to a main CPU and does not require processing capability of the main CPU. According to some embodiments of the disclosure, the hardware accelerator may achieve a very high efficiency for repeated and continuous processing.

The disclosure proposes a PDCP split structure as shown in a protocol architecture 1*i*-02 to perform a sequential ciphering and deciphering procedure (sequential processing)

at a higher speed in the protocol architecture 1*i*-01. The PDCP split structure is characterized in that the PDCP layer functions described above in relation to FIG. 1B or 1D are divided and are performed by an upper PDCP layer 1*i*-05 and lower PDCP layers 1*i*-10 and 1*i*-15.

For example, the upper PDCP layer 1*i*-05 may manage window state variables or a reordering timer, drive a PDCP transmit or receive window, and perform duplicate packet detection or reordering on a PDCP SN basis. However, the functions of the upper PDCP layer 1*i*-05 are not limited thereto. The lower PDCP layers 1*i*-10 and 1*i*-15 may perform duplicate packet detection or ciphering and deciphering. However, the functions of the lower PDCP layers 1*i*-10 and 1*i*-15 are not limited thereto.

According to some embodiments of the disclosure, the upper PDCP layer 1*i*-05 of the receiver is one entity and may receive, from the two lower PDCP layers 1*i*-10 and 1*i*-15, data units that are parallel deciphered (parallel processing), and deliver the data to an upper layer by reordering the data. The upper PDCP layer 1*i*-05 of the transmitter may deliver data units received from an upper layer, to the two lower PDCP layers 1*i*-10 and 1*i*-15 in a distributed manner to parallel cipher the received data units (parallel processing).

As described above, the disclosure proposes the PDCP split structure as shown in the protocol architecture 1*i*-02 for a split bearer using dual connectivity and thus a ciphering and deciphering procedure having a high complexity may be parallel performed by the lower PDCP layers 1*i*-10 and 1*i*-15 (parallel processing). In addition, the lower PDCP layers 1*i*-10 and 1*i*-15 may parallel perform the ciphering and deciphering procedure by using a hardware accelerator and thus data processing may be accelerated.

In FIG. 1I, when the PDCP split structure is applied to a split bearer using dual connectivity, ciphering and deciphering or integrity verification and protection may be performed using different security keys for different BSs (e.g., a master cell group (MCG) and a secondary cell group (SCG)) and thus the upper PDCP layer 1*i*-05 and the lower PDCP layers 1*i*-10 and 1*i*-15 need to share a security key. That is, a security key usable to decipher data units received from a first BS or cell may differ from a security key usable to decipher data units received from a second BS or cell and thus the upper PDCP layer 1*i*-05 needs to share a security key with the lower PDCP layers 1*i*-10 and 1*i*-15. According to some embodiments of the disclosure, one PDCP layer may use one security key and the upper PDCP layer 1*i*-05 needs to share one security key with the lower PDCP layers 1*i*-10 and 1*i*-15.

Using the PDCP split structure proposed by the disclosure, various structures having one upper PDCP layer and two lower PDCP layers may be implemented by dividing the PDCP layer functions described above in relation to FIG. 1B or 1D, and a function having a high complexity may be parallel performed by the two lower PDCP layers. In addition, not only a ciphering or deciphering procedure but also a UDC procedure for compressing or decompressing UL or DL data may be parallel performed by the lower PDCP layers. In other words, various embodiments of the disclosure may be enabled. The number of lower PDCP layers is not particularly limited and may be two or more.

According to some embodiments of the disclosure, the PDCP split structure of the protocol architecture 1*i*-02 may be equally applied to a split bearer using dual connectivity, which has the protocol architecture 1*i*-01 but uses a packet duplication technology by which a PDCP layer duplicates packets and delivers the duplicate packets to two lower RLC layers, thereby accelerating a ciphering and deciphering procedure.

In FIG. 1I, 1*i*-03 indicates a protocol architecture usable when packet duplication is applied to carrier aggregation. An overall transmission/reception operation may be the same as that of the protocol architecture 1*i*-01 and a different therebetween may be that one MAC layer processes data received from two RLC layers connected to one PDCP layer and then transmits and receives the data on different. A protocol architecture 1*i*-04 may be implemented by applying the PDCP split structure of the disclosure to the protocol architecture 1*i*-03 in the same manner as the protocol architecture 1*i*-02 is implemented by applying the PDCP split structure of the disclosure to the protocol architecture 1*i*-01. Thus, upper PDCP layer 1*i*-20 and lower PDCP layers 1*i*-25 and 1*i*-30 may be similar to upper PDCP layer 1*i*-05 and lower PDCP layers 1*i*-10 and 1*i*-15, and thus descriptions of upper PDCP layer 1*i*-20 and lower PDCP layers 1*i*-25 and 1*i*-30 are omitted.

Figure 1J:
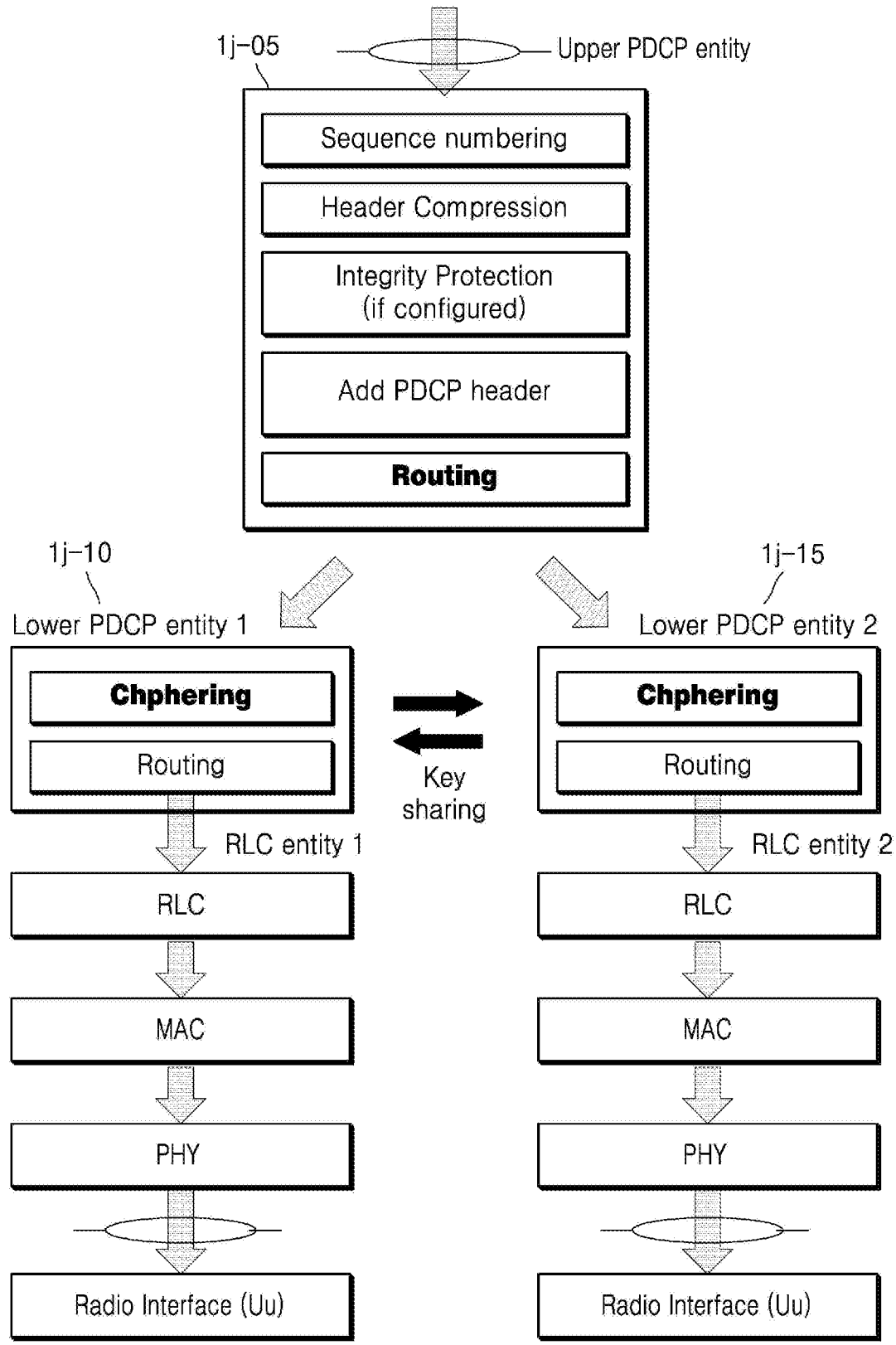
FIG. 1J is schematic diagram of a transmitter (e.g., a BS or a UE) in which a PDCP split structure is applied to a split bearer using dual connectivity, according to an embodiment of the disclosure.
Figure 1K:
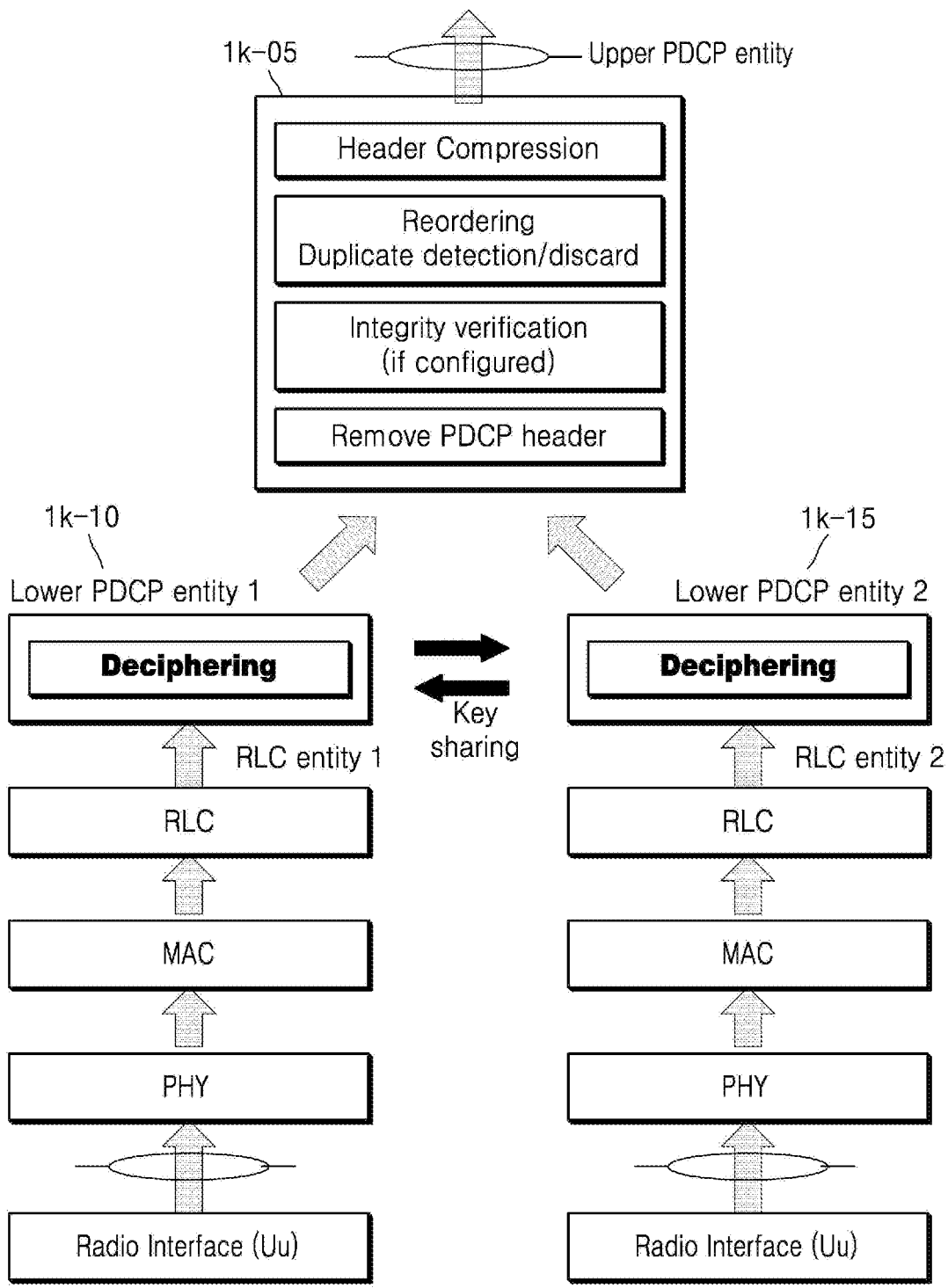
FIG. 1K is schematic diagram of a receiver (e.g., a BS or a UE) in which a PDCP split structure is applied to a split bearer using dual connectivity, according to an embodiment of the disclosure.

FIG. 1J is schematic diagram of a transmitter (e.g., a BS or a UE) in which a PDCP split structure is applied to a split bearer using dual connectivity, according to an embodiment of the disclosure and FIG. 1K is schematic diagram of a receiver (e.g., a BS or a UE) in which a PDCP split structure is applied to a split bearer using dual connectivity, according to an embodiment of the disclosure.

Referring to FIGS. 1J and 1K, a PDCP split structure may be applied as shown in the protocol architecture 1*i*-02 to perform a sequential ciphering and deciphering procedure (sequential processing) at a higher speed in a protocol architecture for a dual-connectivity split bearer. In the PDCP split structure, the PDCP layer functions described above in relation to FIG. 1B or 1D may be divided and be performed by an upper PDCP layer 1*j*-05 or 1*k*-05 and lower PDCP layers 1*j*-10 and 1*j*-15, or 1*k*-10 and 1*k*-15.

According to some embodiments of the disclosure, the upper PDCP layer 1*k*-05 of the receiver is one layer and may receive, from the two lower PDCP layers 1*k*-10 and 1*k*-15, data units that are parallel deciphered (parallel processing), and deliver the data to an upper layer by reordering the data. The upper PDCP layer 1*j*-05 of the transmitter may deliver data units received from an upper layer, to the two lower PDCP layers 1*j*-10 and 1*j*-15 in a distributed manner to parallel cipher the received data units (parallel processing). That is, according to the PDCP split structure, a ciphering and deciphering procedure having a high complexity may be parallel performed by the lower PDCP layers 1*j*-10 and 1*j*-15, or 1*k*-10 and 1*k*-15 (parallel processing). In addition, the lower PDCP layers 1*j*-10 and 1*j*-15, or 1*k*-10 and 1*k*-15 may parallel perform the ciphering and deciphering procedure by using a hardware accelerator and thus data processing may be accelerated.

As described above in relation to FIG. 1I, when the PDCP split structure is applied to a split bearer using dual connectivity, ciphering and deciphering or integrity verification and protection may be performed using different security keys for different BSs (e.g., a MCG and a SCG) and thus the upper PDCP layer 1*j*-05 or 1*k*-05 and the lower PDCP layers 1*j*-10 and 1*j*-15, or 1*k*-10 and 1*k*-15 need to share a security key. That is, a security key usable to decipher data units received from a first BS or cell may differ from a security key usable to decipher data units received from a second BS or cell and thus the upper PDCP layer 1*j*-05 or 1*k*-05 needs to share a security key with the lower PDCP layers 1*j*-10 and 1*j*-15, or 1*k*-10 and 1*k*-15. According to some embodiments of the disclosure, one PDCP layer may use one security key and the upper PDCP layer 1*j*-05 or 1*k*-05 needs to share one security key with the lower PDCP layers 1*j*-10 and 1*j*-15, or 1*k*-10 and 1*k*-15. For example, the upper PDCP layer 1*j*-05 or 1*k*-05 needs to share a security key corresponding to a MCG, with the lower PDCP layers 1*j*-10 and 1*j*-15, or 1*k*-10 and 1*k*-15 when the security key corresponding to the MCG is used, or share a security key corresponding to a SCG, with the lower PDCP layers 1*j*-10 and 1*j*-15, or 1*k*-10 and 1*k*-15 when the security key corresponding to the SCG is used, such that a ciphering and deciphering procedure or an integrity protection and verification procedure may be normally performed.

Figure 1L:
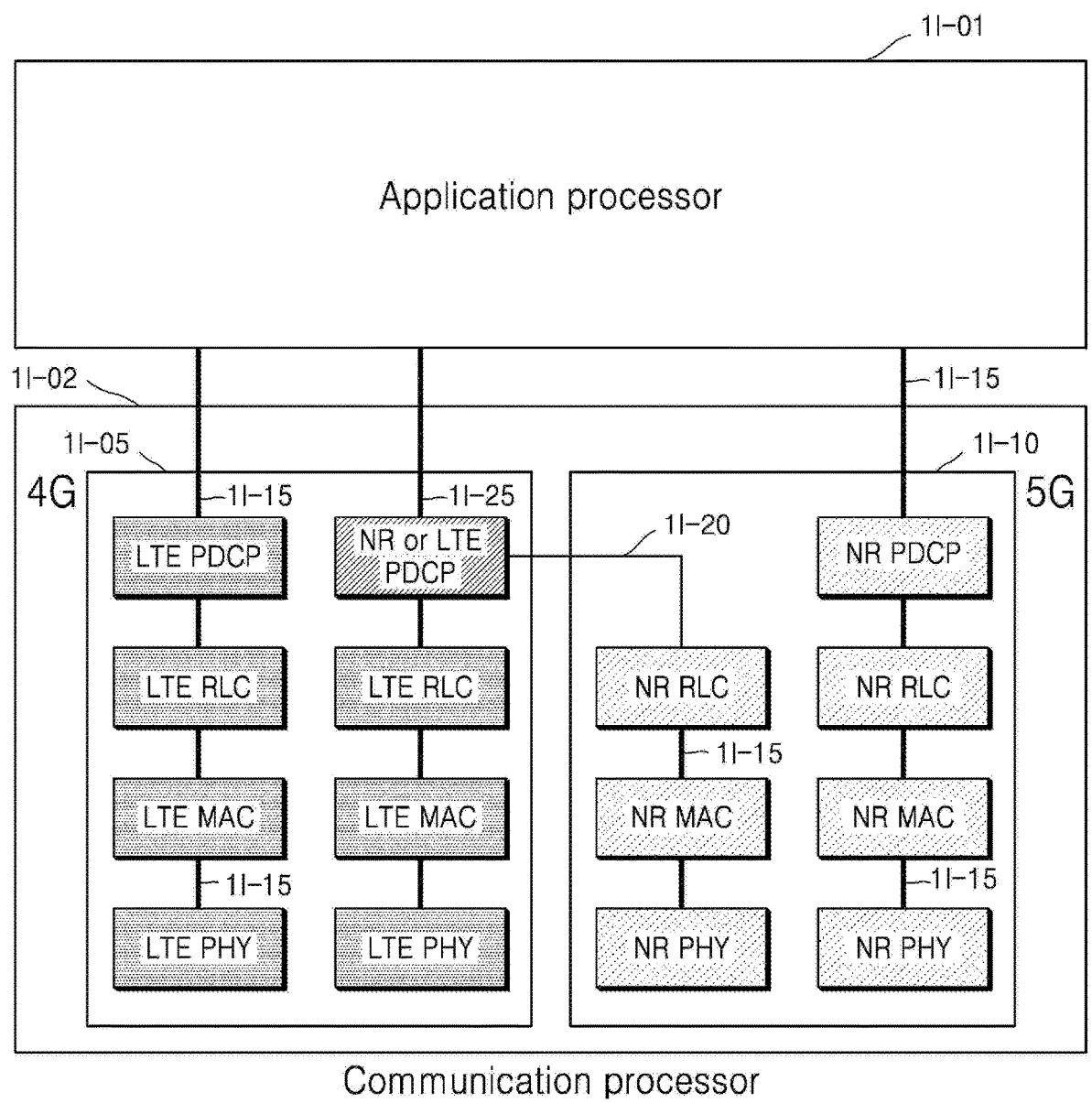
FIG. 1L is a schematic diagram illustrating extensive application of a PDCP split structure, according to an embodiment of the disclosure.

FIG. 1L is a schematic diagram illustrating extensive application of a PDCP split structure, according to an embodiment of the disclosure.

FIG. 1L illustrates an example of an implementable wireless communication modem. The wireless communication modem may include two processors. According to some embodiments of the disclosure, two processors may include an application processor 1*l*-01 and a communication processor 1*l*-02.

According to some embodiments of the disclosure, the communication processor 1*l*-02 may implement the protocols described above in relation to FIGS. 1B and 1D. That is, a chip 1*l*-05 implementing an LTE (or 4G) protocol and a chip 1*l*-10 implementing a NR (OR 5G) protocol may be included as illustrated in FIG. 1L. The communication modem may provide a high-speed interface in the chip 1*l*-05 implementing the LTE protocol, provide a high-speed interface in the chip 1*l*-10 implementing the NR protocol, support a high-speed interface between the application processor 1*l*-01 and the communication processor 1*l*-02, and support high-speed data processing for a high data rate and a low latency. That is, the communication modem may support a high-speed interface for all interfaces 1*l*-15 in FIG. 1L. The communication modem may also support a high-speed interface in the application processor 1*l*-01.

According to some embodiments of the disclosure, the communication modem may not support a high-speed interface for an interface 1*l*-20 in FIG. 1L between the chip 1*l*-05 implementing the LTE protocol and the chip 1*l*-10 implementing the NR protocol. For example, for convenience of implementation, chips may be implemented and then an interface between hardware (e.g., a chip) implementing an LTE protocol and hardware (e.g., a chip) implementing a NR protocol may be implemented separately, thereby not supporting a high-speed interface. That is, the interface 1*l*-20 may be implemented as a low-speed interface. However, the interface implementation is not limited thereto.

As described above, a dual-connectivity split bearer 1*l*-25 illustrated in FIG. 1L may not easily support a high data rate due to the low-speed interface 1*l*-20 in some communication modem architectures. That is, although a high-speed interface may be supported between a PDCP layer implemented in an LTE modem and an RLC layer implemented in an LTE modem, only a low-speed interface may be supported between a PDCP layer implemented in an LTE modem and an RLC layer implemented in a NR modem and thus performance of data processing may be reduced. According to some embodiments of the disclosure, the same problem may also occur in a dual-connectivity split bearer configured in a NR modem. That is, although a high-speed interface may be supported between a PDCP layer implemented in a NR modem and an RLC layer implemented in a NR modem, only a low-speed interface may be supported between a PDCP layer implemented in a NR modem and an RLC layer implemented in an LTE modem and thus performance of data processing may be reduced.

Figure 1M:
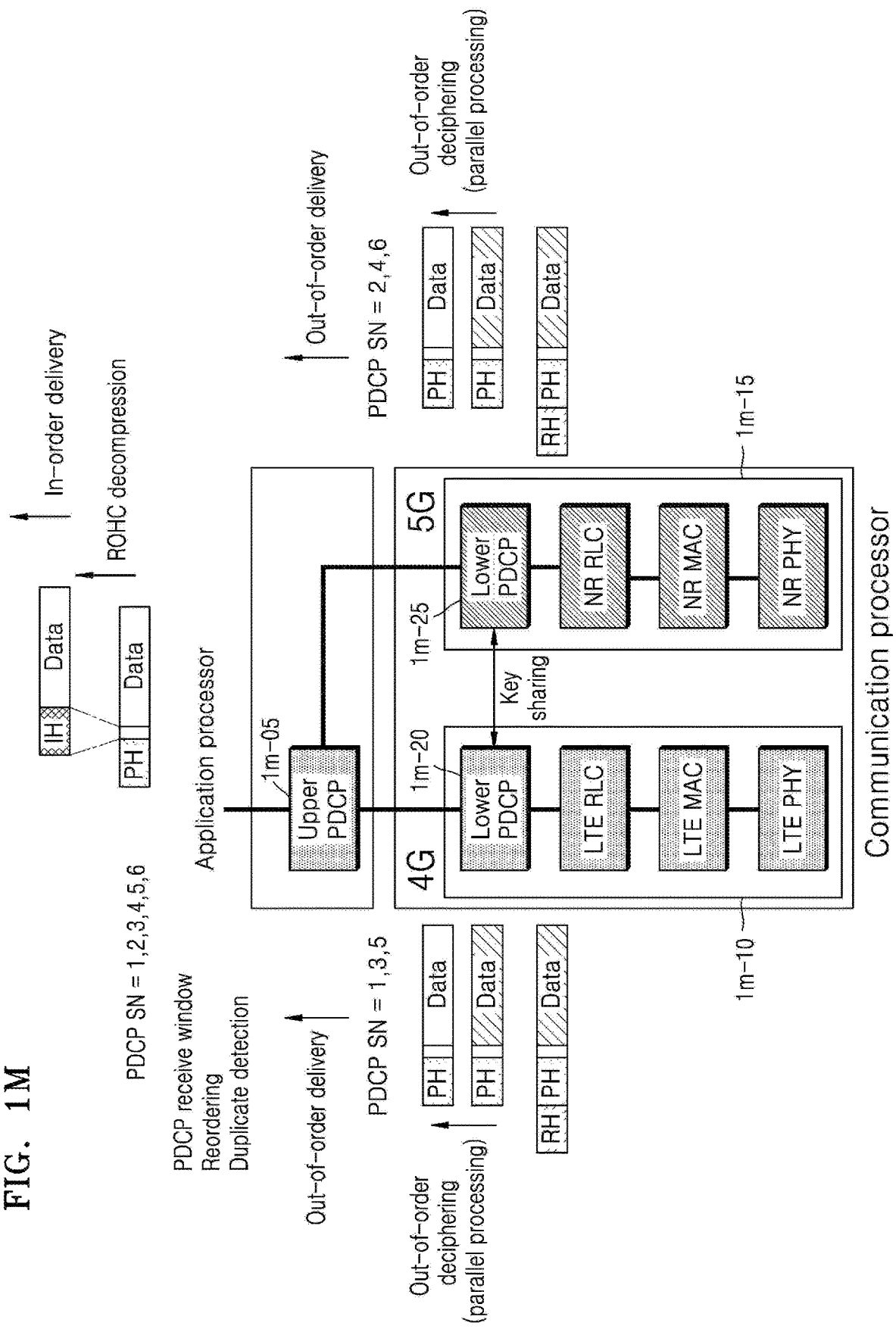
FIG. 1M is a schematic diagram for describing a method of applying a PDCP split structure, according to an embodiment of the disclosure.

FIG. 1M is a schematic diagram for describing a method of applying a PDCP split structure, according to an embodiment of the disclosure.

Referring to FIG. 1M, application of a PDCP split structure capable of solving the problem described above in relation to FIG. 1L will now be described with reference to FIG. 1M. As illustrated in FIG. 1M, to avoid a low-speed interface in the modem designed as illustrated in FIG. 1L, a communication modem of FIG. 1M may implement an upper PDCP layer 1*m*-05 in an application processor supporting a high-speed interface, implement a lower PDCP layer 1*m*-20 in an LTE chip 1*m*-10, and implement another lower PDCP layer 1*m*-25 in a NR chip 1*m*-15. Therefore, the communication modem of FIG. 1M may be implemented to support a high-speed interface for all interfaces between protocols of a split structure using dual connectivity. That is, the communication modem of FIG. 1M may apply the PDCP split structure to the application processor and the communication processor without using but by avoiding a low-speed interface supported in FIG. 1L, and may use only high-speed interfaces.

As illustrated in FIG. 1M, the PDCP split structure may be applied to perform a deciphering procedure at a higher speed in a protocol architecture for a dual-connectivity split bearer. In the PDCP split structure, the PDCP layer functions described above in relation to FIG. 1B or 1D may be divided and be performed by the upper PDCP layer 1*m*-05 and the lower PDCP layers 1*m*-20 and 1*m*-25.

According to some embodiments of the disclosure, the upper PDCP layer 1*m*-05 of a receiver is one layer and may receive, from the two lower PDCP layers 1*m*-20 and 1*m*-25, data units that are parallel deciphered (parallel processing) regardless of PDCP SNs (out-of-order deciphering), and deliver the data to an upper layer by reordering the data (in-order delivery). That is, according to the PDCP split structure, a ciphering and deciphering procedure having a high complexity may be parallel performed by the lower PDCP layers 1*m*-20 and 1*m*-25 (parallel processing). In addition, the lower PDCP layers 1*m*-20 and 1*m*-25 may parallel perform the ciphering and deciphering procedure by using a hardware accelerator and thus data processing may be accelerated.

According to some embodiments of the disclosure, in FIG. 1M, when the PDCP split structure is applied to a split bearer using dual connectivity, ciphering and deciphering or integrity verification and protection may be performed using different security keys for different BSs (e.g., a MCG and a SCG) and thus the upper PDCP layer 1*m*-05 and the lower PDCP layers 1*m*-20 and 1*m*-25 need to share a security key. That is, a security key usable to decipher data units received from a first BS or cell may differ from a security key usable to decipher data units received from a second BS or cell and thus the upper PDCP layer 1*m*-05 needs to share a security key with the lower PDCP layers 1*m*-20 and 1*m*-25. One PDCP layer may use one security key and the upper PDCP layer 1*m*-05 needs to share one security key with the lower PDCP layers 1*m*-20 and 1*m*-25. For example, the upper PDCP layer 1*m*-05 needs to share a security key corresponding to a MCG, with the lower PDCP layers 1*m*-20 and 1*m*-25 when the security key corresponding to the MCG is used, or share a security key corresponding to a SCG, with the lower PDCP layers 1*m*-20 and 1*m*-25 when the security key corresponding to the SCG is used, such that a ciphering and deciphering procedure or an integrity protection and verification procedure may be normally performed.

According to some embodiments of the disclosure, the procedure described above in relation to FIG. 1M may also be applied to the protocol architecture 1*i*-02 for applying packet duplication to dual connectivity and the protocol architecture 1*i*-03 for applying packet duplication to carrier aggregation in FIG. 1I.

Figure 1N:
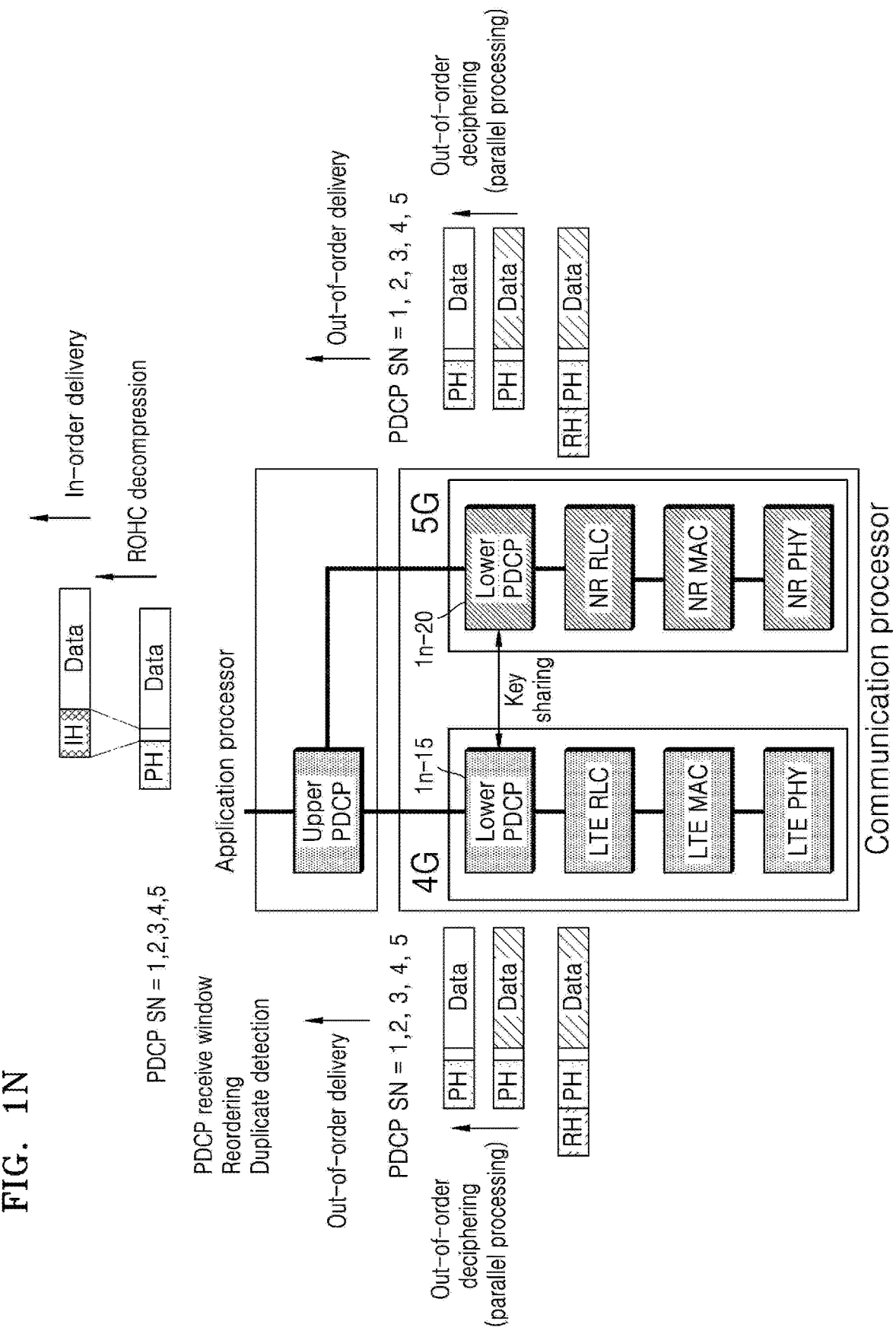
FIG. 1N is a schematic diagram for describing application of a PDCP split structure to a bearer in which packet duplication is applied to carrier aggregation or dual connectivity, according to an embodiment of the disclosure.
Figure 10:
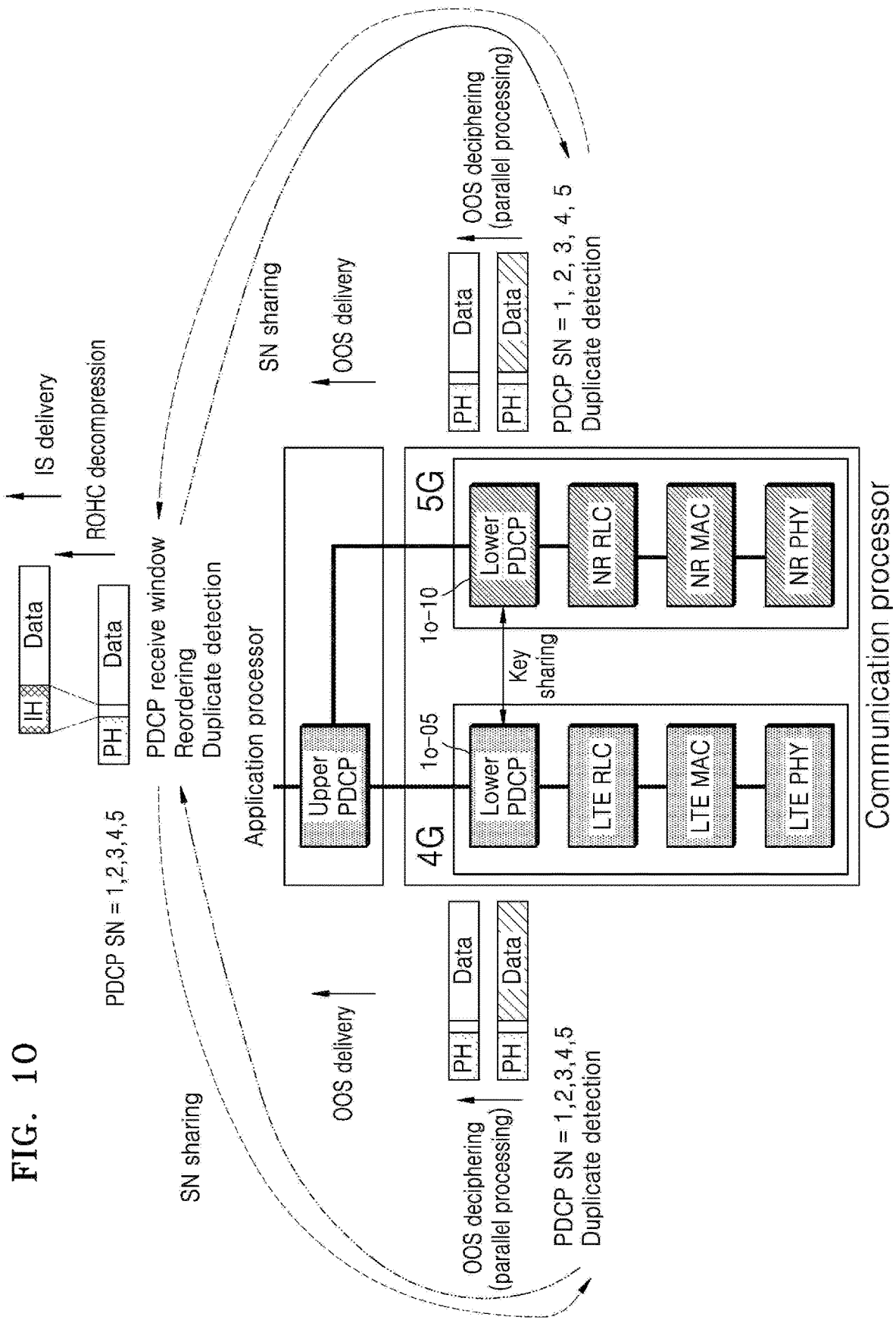

FIG. 1N is a schematic diagram for describing application of a PDCP split structure to a bearer in which packet duplication is applied to carrier aggregation or dual connectivity, according to an embodiment of the disclosure.

FIG. 1N illustrates an example of applying the PDCP split structure of the disclosure to a bearer in which packet duplication is applied to dual connectivity. Packet duplication is a technology by which a transmitter PDCP layer duplicates packets and transmits the packets to two different RLC layers through different routes to reduce latency and increase reliability. Therefore, a receiver PDCP layer may process only an earlier-received packet and discard a duplicate packet on a PDCP SN basis.

When packet duplication is used as described above, the receiver PDCP layer may not unnecessarily process duplicate data by performing duplicate detection on a PDCP SN basis. That is, as illustrated in FIG. 1N, duplicate data units may be received by RLC layers and be delivered to lower PDCP layers 1*n*-15 and 1*n*-20. Therefore, when the lower PDCP layers 1*n*-15 and 1*n*-20 do not perform duplicate detection on a PDCP SN basis, the two lower PDCP layers 1*n*-15 and 1*n*-20 may unnecessarily parallel decipher the duplicate data units and thus burden of processing may be increased.

In FIG. 1M, different data units are received by two lower PDCP layers and thus unnecessary deciphering may not occur. That is, the lower PDCP layers 1*n*-15 and 1*n*-20 may require duplicate detection for a case when packet duplication is configured.

Figure 1P:
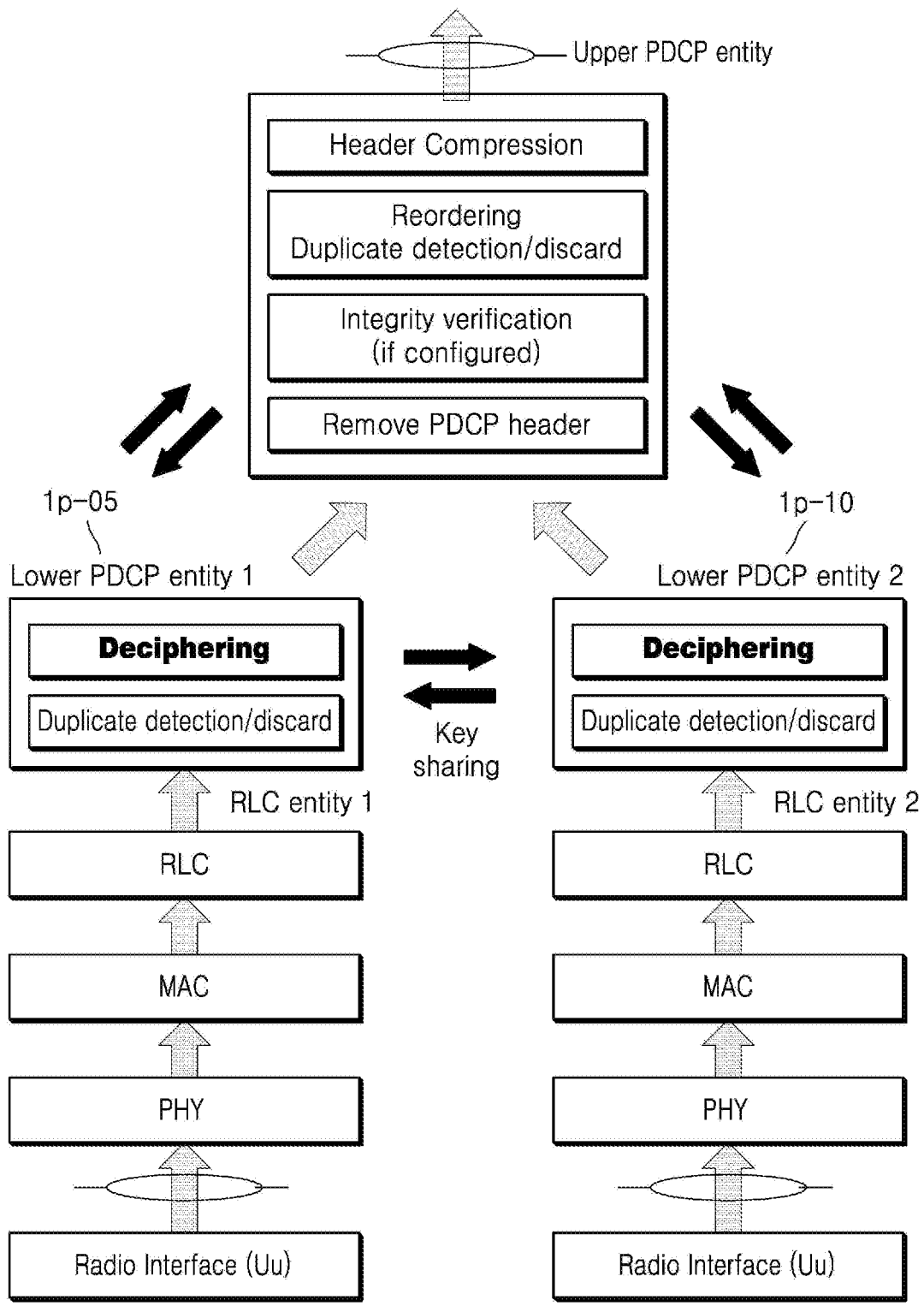
FIG. 1P is schematic diagram for describing a method of preventing unnecessary burden of processing, according to some embodiments of the disclosure.

FIGS. 1O and 1P are schematic diagrams for describing a method of preventing unnecessary burden of processing, according to various embodiments of the disclosure.

FIGS. 1O and 1P illustrate that lower PDCP layers perform duplicate detection on a PDCP SN basis when a PDCP split structure proposed by the disclosure is applied. That is, lower PDCP layers 1*o*-05 and 1*o*-10, or 1*p*-05 and 1*p*-10 may check PDCP SNs of PDCP headers before processing data received from lower RLC layers, discard and not decipher data units, which have been already received, on a PDCP SN basis, and decipher and deliver only data units, which have not been already received, to an upper PDCP layer.

According to some embodiments of the disclosure, the lower PDCP layers 1*o*-05 and 1*o*-10, or 1*p*-05 and 1*p*-10 need to share information about the received PDCP SNs to perform duplicate detection on a PDCP SN basis and thus PDCP SNs may be shared between the upper PDCP layer and the lower PDCP layers 1*o*-05 and 1*o*-10, or 1*p*-05 and 1*p*-10.

Methods of sharing PDCP SNs between the upper PDCP layer and the lower PDCP layers 1*o*-05 and 1*o*-10, or 1*p*-05 and 1*p*-10 are as described below.

1. Method 1: When data is received from each lower RLC layer, each lower PDCP layer may check a PDCP header and share information about a PDCP SN with an upper PDCP layer, and the upper PDCP layer may share the information about the PDCP SN with another lower PDCP layer. When data is received from each lower RLC layer, each lower PDCP layer may check a PDCP SN of a PDCP header and perform duplicate detection to discard a duplicate packet before performing a deciphering procedure.

2. Method 2: An upper PDCP layer may check PDCP SNs of data units received from lower PDCP layers, and share information about the PDCP SNs with different lower PDCP layers. When data is received from each lower RLC layer, each lower PDCP layer may check a PDCP SN of a PDCP header and perform duplicate detection to discard a duplicate packet before performing a deciphering procedure.

3. Method 3: When integrity protection and verification are configured (or in the case of a SRB), an upper PDCP layer may perform integrity verification on data units received from lower PDCP layers and share information about PDCP SNs of data units having no integrity problems, with the lower PDCP layers. When data is received from each lower RLC layer, each lower PDCP layer may check a PDCP SN of a PDCP header and perform duplicate detection to discard a duplicate packet before performing a deciphering procedure.

According to some embodiments of the disclosure, in the above-described procedure, the upper PDCP layer may also perform duplicate detection on a PDCP SN basis. Each lower PDCP layer may not detect all duplicate packets due to a difference in timing of sharing PDCP SNs and thus the upper PDCP layer may also perform duplicate detection on a PDCP SN basis.

Figure 1Q:
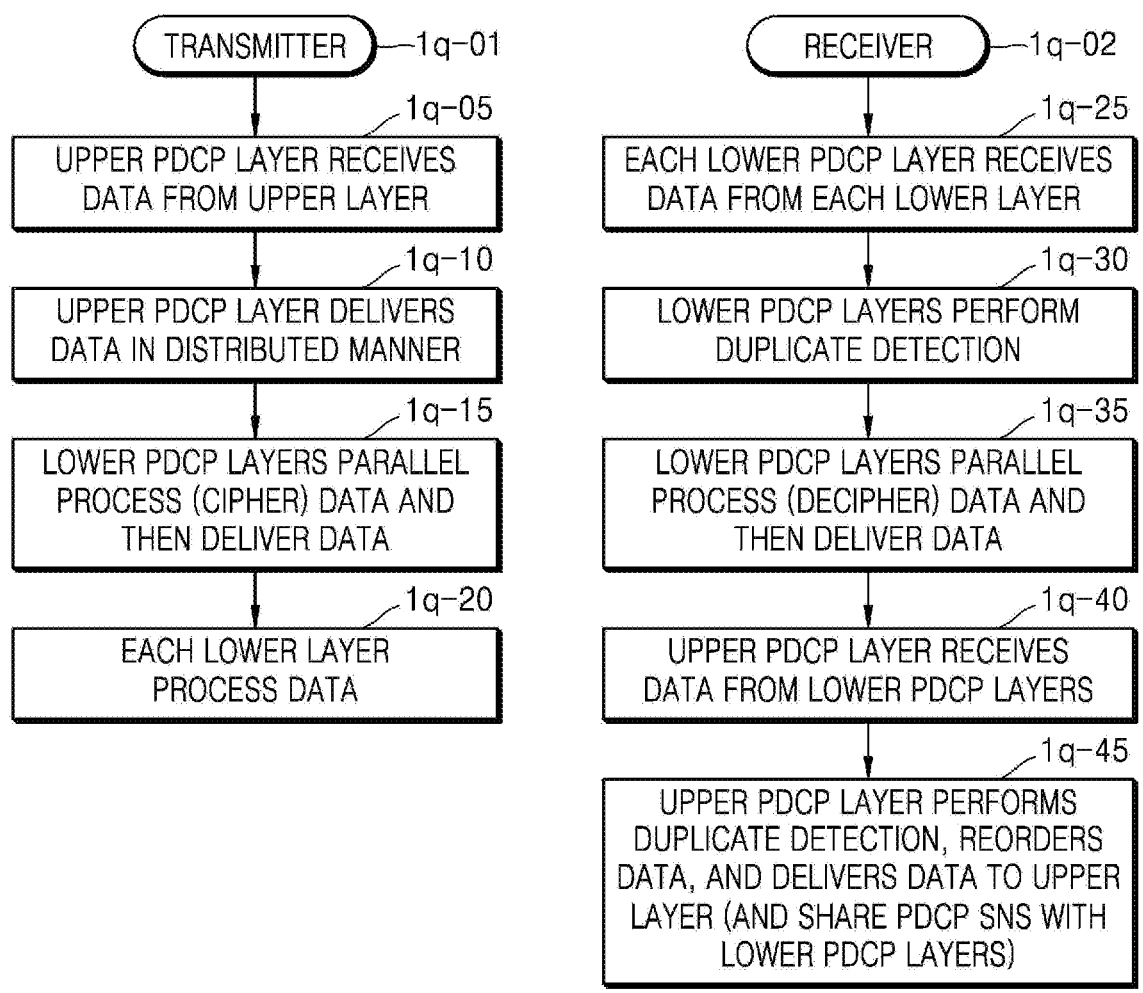
FIG. 1Q shows flowcharts for describing operations of a transmitter (e.g., a UE or a BS) and a receiver (e.g., a UE or a BS) in a PDCP split structure, according to an embodiment of the disclosure.

FIG. 1Q shows flowcharts for describing operations of a transmitter 1*q*-01 (e.g., a UE or a BS) and a receiver 1*q*-02 (e.g., a UE or a BS) in a PDCP split structure, according to an embodiment of the disclosure.

In the transmitter 1*q*-01 (e.g., a UE or a BS) of FIG. 1Q, an upper PDCP layer of the PDCP split structure proposed by the disclosure may receive data from an upper layer in operation 1*q*-05. The upper PDCP layer may perform ROHC header compression on the received data when ROHC header compression is configured, perform integrity protection on the received data when integrity protection is configured, configure PDCP headers, and deliver the data to two lower PDCP layers in a distributed manner at a certain ratio in operation 1*q*-10. The lower PDCP layers having received the data may parallel cipher the data by using a hardware accelerator and deliver the data to lower RLC layers connected to the lower PDCP layers in operation 1*q*-15, and lower layers may process the data in operation 1*q*-20.

In the receiver 1*q*-02 (e.g., a UE or a BS) of FIG. 1Q, each lower PDCP layer of the PDCP split structure proposed by the disclosure may receive data from each lower RLC layer in operation 1*q*-25. When the data is received, the lower PDCP layers may initially perform duplicate detection on a PDCP SN basis to discard duplicate data units in operation 1*q*-30. The lower PDCP layers may parallel decipher non-duplicate data units and deliver the data to an upper PDCP layer in operation 1*q*-35. The upper PDCP layer having received the data in operation 1*q*-40 may perform duplicate detection on a PDCP SN basis, reorder the data units in ascending order, perform integrity protection and verification when integrity protection and verification are configured, perform ROHC header compression/decompression when ROHC header compression/decompression is configured, and deliver the data to an upper layer in operation 1*q*-45. The upper PDCP layer and the lower PDCP layers may share information about successfully received PDCP SNs.

Figure 1R:
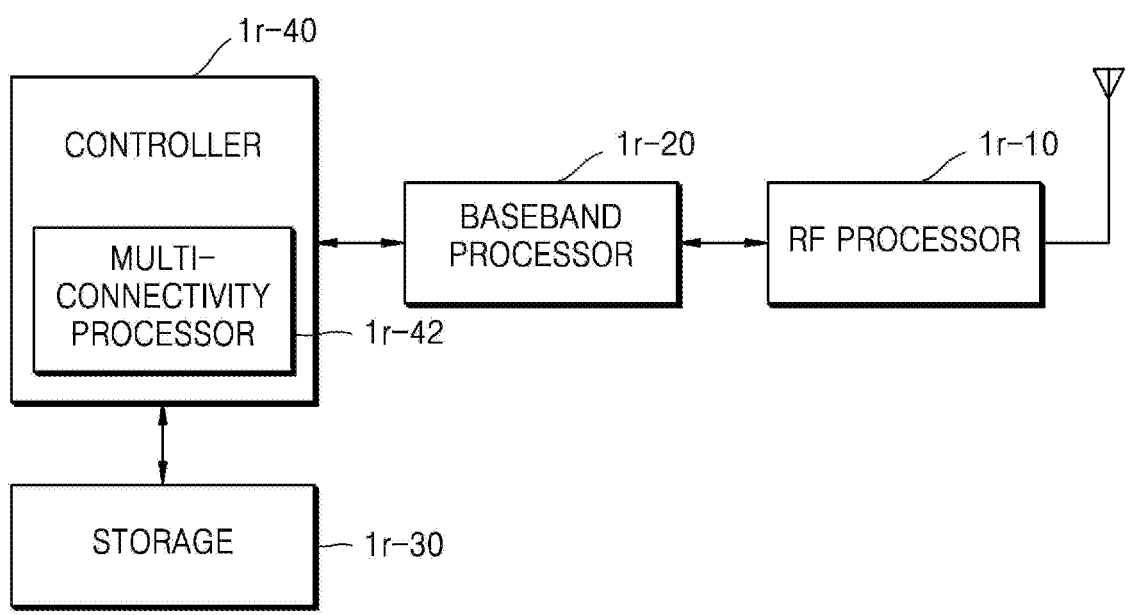
FIG. 1R is a block diagram of a UE according to an embodiment of the disclosure.

FIG. 1R is a block diagram of a UE according to an embodiment of the disclosure.

Referring to FIG. 1R, the UE includes a radio frequency (RF) processor 1*r*-10, a baseband processor 1*r*-20, a storage 1*r*-30, and a controller 1*r*-40. Also, the controller 1*r*-40 may further include a multi-connectivity processor 1*r*-42. However, the UE is not limited thereto and may include a smaller or larger number of elements compared to the above-mentioned elements.

The RF processor 1r-10 may perform functions for transmitting and receiving signals through radio channels, e.g., band conversion and amplification of signals. That is, the RF processor 1r-10 may up-convert a baseband signal provided from the baseband processor 1r-20, into a RF band signal and then transmit the RF band signal through an antenna, and down-convert an RF band signal received through an antenna, into a baseband signal. For example, the RF processor 1r-10 may include a transmitting filter, a receiving filter, an amplifier, a mixer, an oscillator, a digital-to-analog convertor (DAC), and an analog-to-digital convertor (ADC). Although only one antenna is illustrated in FIG. 1R, the UE may include a plurality of antennas. The RF processor 1r-10 may include a plurality of RF chains. The RF processor 1r-10 may perform beamforming. For beamforming, the RF processor 1r-10 may adjust phases and sizes of signals to be transmitted or having received through a plurality of antennas or antenna elements. The RF processor 1r-10 may perform MIMO and may receive data of a plurality of layers in the MIMO operation. The RF processor 1r-10 may perform received beam sweeping by appropriately configuring a plurality of antennas or antenna elements, or adjust a direction and a beam width of a received beam to coordinate with a transmit beam, under the control of the controller 1r-40.

The baseband processor 1r-20 may convert between a baseband signal and a bitstream based on PHY layer specifications of a system. For example, for data transmission, the baseband processor 1r-20 may generate complex symbols by encoding and modulating a transmit bitstream. For data reception, the baseband processor 1r-20 may reconstruct a received bitstream by demodulating and decoding a baseband signal provided from the RF processor 1r-10. For example, according to an OFDM scheme, for data transmission, the baseband processor 1r-20 may generate complex symbols by encoding and modulating a transmit bitstream, map the complex symbols to subcarriers, and then configure OFDM symbols by performing inverse fast Fourier transformation (IFFT) and cyclic prefix (CP) insertion. For data reception, the baseband processor 1r-20 may segment a baseband signal provided from the RF processor 1r-10, into OFDM symbol units, reconstruct signals mapped to subcarriers by performing fast Fourier transformation (FFT), and then reconstruct a received bitstream by demodulating and decoding the signals.

The baseband processor 1r-20 and the RF processor 1r-10 may transmit and receive signals as described above. Therefore, the baseband processor 1r-20 and the RF processor 1r-10 may also be called a transmitter, a receiver, a transceiver, or a communicator. At least one of the baseband processor 1r-20 or the RF processor 1r-10 may include a plurality of communication modules to support a plurality of different radio access technologies. At least one of the baseband processor 1r-20 or the RF processor 1r-10 may include different communication modules to process signals of different frequency bands. For example, the different radio access technologies may include an LTE network and a NR network. The different frequency bands may include a super-high frequency (SHF) (e.g., 2.2 gHz or 2 gHz) band and a millimeter wave (mmWave) (e.g., 60 GHz) band. The UE may transmit and receive signals to and from a BS by using the baseband processor 1r-20 and the RF processor 1r-10, and the signals may include control information and data.

The storage 1r-30 may store basic programs, application programs, and data, e.g., configuration information, for operations of the UE. The storage 1r-30 may provide the stored data upon request by the controller 1r-40. The storage 1r-30 may include any or a combination of storage media such as read-only memory (ROM), random access memory (RAM), a hard disk, a compact disc (CD)-ROM, and a digital versatile disc (DVD). The storage 1r-30 may include a plurality of memories. According to some embodiments of the disclosure, the storage 1r-30 may store a program for supporting beam-based cooperative communication.

The controller 1r-40 controls overall operations of the UE. For example, the controller 1r-40 may transmit and receive signals through the baseband processor 1r-20 and the RF processor 1r-10. The controller 1r-40 records and reads data on or from the storage 1r-30. The controller 1r-40 may include at least one processor. For example, the controller 1r-40 may include a communication processor (CP) for controlling communications and an application processor (AP) for controlling an upper layer such as an application program.

Figure 1S:
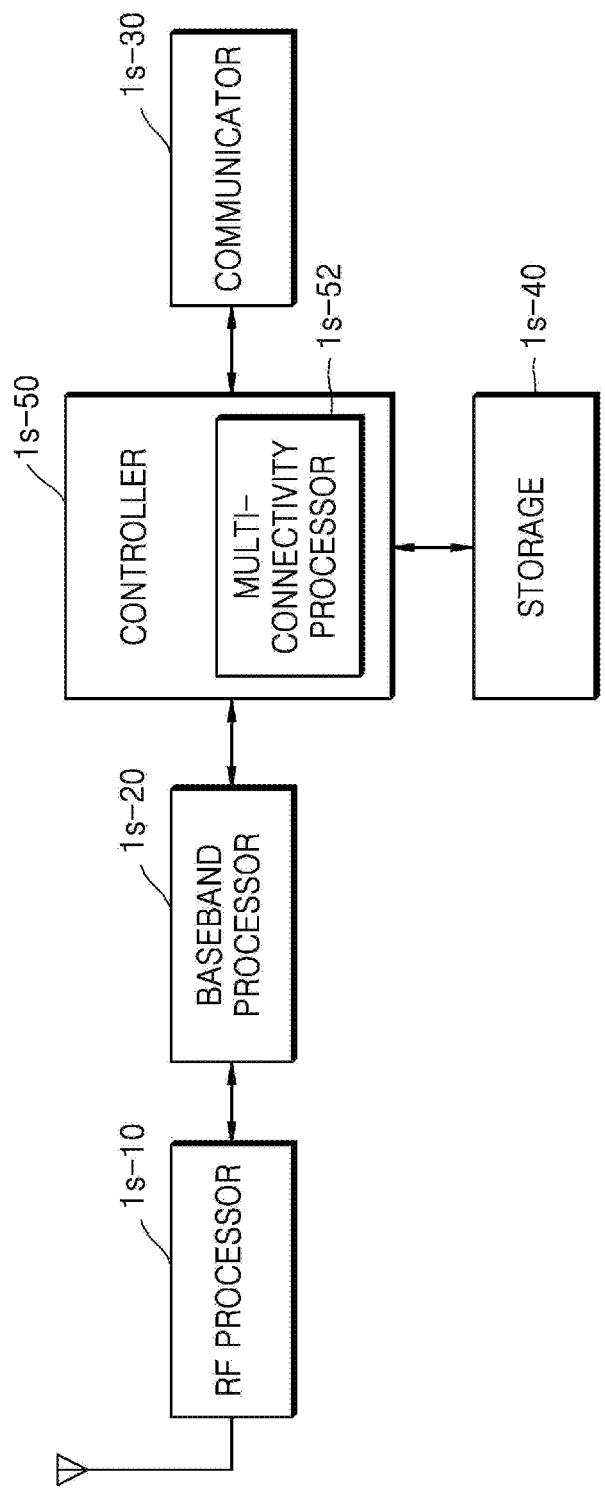
FIG. 1S is a block diagram of a transmission/reception point (TRP) in a wireless communication system, according to an embodiment of the disclosure.

FIG. 1S is a block diagram of a transmission/reception point (TRP) in a wireless communication system, according to an embodiment of the disclosure.

Referring to FIG. 1S, a BS includes a RF processor 1s-10, a baseband processor 1s-20, a communicator 1s-30, a storage 1s-40, and a controller 1s-50. Also, the controller 1s-10 may further include a multi-connectivity processor 1s-52. However, the BS is not limited thereto and may include a smaller or larger number of elements compared to the above-mentioned elements.

The RF processor 1s-10 may perform functions for transmitting and receiving signals through radio channels, e.g., band conversion and amplification of signals. The RF processor 1s-10 may up-convert a baseband signal provided from the baseband processor 1s-20, into a RF band signal and then transmit the RF band signal through an antenna, and down-convert an RF band signal received through an antenna, into a baseband signal. For example, the RF processor 1s-10 may include a transmitting filter, a receiving filter, an amplifier, a mixer, an oscillator, a DAC, and an ADC. Although only one antenna is illustrated in FIG. 1S, the RF processor 1s-10 may include a plurality of antennas. The RF processor 1s-10 may include a plurality of RF chains. The RF processor 1s-10 may perform beamforming. For beamforming, the RF processor 1s-10 may adjust phases and sizes of signals to be transmitted or having received through a plurality of antennas or antenna elements. The RF processor 1s-10 may perform DL MIMO by transmitting data of one or more layers.

The baseband processor 1s-20 may convert between a baseband signal and a bitstream based on PHY layer specifications of a first radio access technology (e.g., a system). For example, for data transmission, the baseband processor 1s-20 may generate complex symbols by encoding and modulating a transmit bitstream. For data reception, the baseband processor 1s-20 may reconstruct a received bitstream by demodulating and decoding a baseband signal provided from the RF processor 1s-10. For example, according to an OFDM scheme, for data transmission, the baseband processor 1s-20 generates complex symbols by encoding and modulating a transmit bitstream, maps the complex symbols to subcarriers, and then configures OFDM symbols by performing IFFT and CP insertion. For data reception, the baseband processor 1s-20 may segment a baseband signal provided from the RF processor 1s-10, into OFDM symbol units, reconstruct signals mapped to subcarriers by performing FFT, and then reconstruct a received bitstream by demodulating and decoding the signals. The baseband processor 1s-20 and the RF processor 1s-10 may transmit and receive signals as described above. Therefore, the baseband processor 1s-20 and the RF processor 1s-10 may also be called a transmitter, a receiver, a transceiver, a communicator, or a wireless communicator. The BS may transmit and receive signals to and from a UE by using the baseband processor 1s-20 and the RF processor 1s-10, and the signals may include control information and data.

The communicator 1s-30 may provide an interface for communicating with other nodes in a network. According to some embodiments of the disclosure, the communicator 1s-30 may be a backhaul communicator.

The storage 1s-40 may store basic programs, application programs, and data, e.g., configuration information, for operations of the BS. The storage 1s-40 may store, for example, information about bearers allocated for a connected UE and measurement results reported from the connected UE. The storage 1s-40 may store criteria information used to determine whether to provide or release multi-connectivity to or from the UE. The storage 1s-40 provides the stored data upon request by the controller 1s-50. The storage 1s-40 may include any or a combination of storage media such as ROM, RAM, a hard disk, a CD-ROM, and a DVD. The storage 1s-40 may include a plurality of memories. According to some embodiments of the disclosure, the storage 1s-40 may store a program for supporting beam-based cooperative communication.

The controller 1s-50 controls overall operations of the BS. For example, the controller 1s-50 transmits and receives signals through the baseband processor 1s-20 and the RF processor 1s-10, or the communicator 1s-30. The controller 1s-50 records and reads data on or from the storage 1s-40. The controller 1s-50 may include at least one processor.

According to the afore-described embodiments of the disclosure, an apparatus and method capable of effectively providing services in a mobile communication system may be provided.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description and the disclosure is not limited to the singular or plural form. An element expressed in a singular form may include a plurality of elements, and elements expressed in a plural form may include a single element.

It is understood that embodiments of the disclosure described herein is considered in a descriptive sense only and not for purposes of limitation. That is, it will be understood by one of ordinary skill in the art that various changes in form and details may be made in the embodiments of the disclosure without departing from the scope as defined by the following claims. The embodiments of the disclosure may be combined as necessary. For example, a BS and a UE may operate according to a combination of parts of different embodiments of the disclosure. The disclosure may be applied to all frequency division duplex (FDD)/time division duplex (TDD) systems, and other modifications based on technical aspects of the embodiments of the disclosure may be applied to other systems, such as LTE, 5G, or NR systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A data processing method of a data reception apparatus, the data processing method comprising:
    obtaining, by a first lower packet data convergence protocol (PDCP) layer and a second lower PDCP layer, a plurality of PDCP packet data units (PDUs) based on data received from a first base station (BS) and a second BS;
    parallel deciphering, by the first and second lower PDCP layers, the plurality of PDCP PDUs;
    transmitting, from the first and second lower PDCP layers to an upper PDCP layer, the plurality of deciphered PDCP PDUs; and
    reordering, by the upper PDCP layer, the plurality of deciphered PDCP PDUs.

2. The data processing method of claim 1, further comprising:
    providing, from the upper PDCP layer to the first and second lower PDCP layers, security keys corresponding to the first and second BSs and used to decipher the plurality of PDCP PDUs.

3. The data processing method of claim 1, further comprising:
    discarding, by the first and second lower PDCP layers, already received PDCP PDUs based on PDCP sequence number (SN) information provided from the upper PDCP layer.

4. The data processing method of claim 3, wherein the PDCP SN information comprises information based on PDCP SNs of the PDCP PDUs, the PDCP SNs being received by each lower PDCP layer and the PDCP PDUs being provided from the first and second lower PDCP layers to the upper PDCP layer.

5. The data processing method of claim 3, wherein the PDCP SN information comprises:
information based on PDCP SNs of the PDCP PDUs received by the upper PDCP layer from the first and second lower PDCP layers; or
information based on PDCP SNs of PDCP PDUs having no integrity problems after integrity verification is performed on the PDCP PDUs received by the upper PDCP layer from the first and second lower PDCP layers.

6. A data processing method of a data transmission apparatus, the data processing method comprising:
receiving, by an upper packet data convergence protocol (PDCP) layer from an upper layer, a plurality of PDCP service data units (SDUs);
allocating, by the upper PDCP layer, sequence numbers (SNs) corresponding to the plurality of received PDCP SDUs;
transmitting, from the upper PDCP layer to a first lower PDCP layer and a second lower PDCP layer, the plurality of PDCP SDUs in a distributed manner at a certain ratio; and
parallel ciphering, by the first and second lower PDCP layers, the plurality of PDCP SDUs.

7. The data processing method of claim 6, further comprising:
providing, from the upper PDCP layer to the first and second lower PDCP layers, security keys corresponding to a first base station (BS) and a second BS and used to cipher the plurality of PDCP SDUs.

8. The data processing method of claim 6, further comprising:
compressing, by the upper PDCP layer, each of generated headers when a header compression and decompression protocol is configured; and
generating, by the upper PDCP layer, a message authentication code-integrity (MAC-I) corresponding to the plurality of PDCP SDUs when integrity protection is configured.

9. The data processing method of claim 6, further comprising:
concatenating, by the first and second lower PDCP layers, the headers corresponding to the plurality of PDCP SDUs, to the plurality of ciphered PDCP SDUs.

10. The data processing method of claim 6, wherein the upper PDCP layer is controlled by an application processor.

11. A data reception apparatus in a wireless communication system, the data reception apparatus comprising:
a transceiver; and
at least one processor coupled with the transceiver and configured to:
control a first lower packet data convergence protocol (PDCP) layer and a second lower PDCP layer to obtain a plurality of PDCP packet data units (PDUs) based on data received from a first base station (BS) and a second BS,
control the first and second lower PDCP layers to parallel decipher the plurality of PDCP PDUs,
control the first and second lower PDCP layers to transmit, to an upper PDCP layer, the plurality of deciphered PDCP PDUs, and
control the upper PDCP layer to reorder the plurality of deciphered PDCP PDUs.

12. The data reception apparatus of claim 11, wherein the at least one processor is further configured to:
control the upper PDCP layer to provide, to the first and second lower PDCP layers, security keys corresponding to the first and second BSs and used to decipher the plurality of PDCP PDUs.

13. The data reception apparatus of claim 11, wherein the at least one processor is further configured to:
control the first and second lower PDCP layers to discard already received PDCP PDUs based on PDCP sequence number (SN) information provided from the upper PDCP layer.

14. The data reception apparatus of claim 13, wherein the PDCP SN information comprises information based on PDCP SNs of the PDCP PDUs, the PDCP SNs being received by each lower PDCP layer and the PDCP PDUs being provided from the first and second lower PDCP layers to the upper PDCP layer.

15. The data reception apparatus of claim 13, wherein the PDCP SN information comprises:
information based on PDCP SNs of the PDCP PDUs received by the upper PDCP layer from the first and second lower PDCP layers; or
information based on PDCP SNs of PDCP PDUs having no integrity problems after integrity verification is performed on the PDCP PDUs received by the upper PDCP layer from the first and second lower PDCP layers.

16. A data transmission apparatus in a wireless communication system, the data transmission apparatus comprising:
a transceiver; and
at least one processor coupled with the transceiver and configured to:
control an upper packet data convergence protocol (PDCP) layer to receive, from an upper layer, a plurality of PDCP service data units (SDUs),
control the upper PDCP layer to allocate sequence numbers (SNs) corresponding to the plurality of received PDCP SDUs,
control the upper PDCP layer to transmit, to a first lower PDCP layer and a second lower PDCP layer, the plurality of PDCP SDUs in a distributed manner at a certain ratio, and
control the first and second lower PDCP layers to parallel cipher the plurality of PDCP SDUs.

17. The data transmission apparatus of claim 16, wherein the at least one processor is further configured to:
control the upper PDCP layer to provide, to the first and second lower PDCP layers, security keys corresponding to a first BS and a second BS and used to cipher the plurality of PDCP SDUs.

18. The data transmission apparatus of claim 16, wherein the at least one processor is further configured to:
control the upper PDCP layer to compress each of generated headers when a header compression and decompression protocol is configured, and
control the upper PDCP layer to generate a message authentication code-integrity (MAC-I) corresponding to the plurality of PDCP SDUs when integrity protection is configured.

19. The data transmission apparatus of claim 16, wherein the at least one processor is further configured to:
control the first and second lower PDCP layers to concatenate the headers corresponding to the plurality of PDCP SDUs, to the plurality of ciphered PDCP SDUs.

20. The data transmission apparatus of claim 16,
wherein the at least one processor comprises an application processor, and wherein the application processor is configured to control the upper PDCP layer.

\* \* \* \* \*